US009784113B2

(12) United States Patent
Fremont et al.

(10) Patent No.: US 9,784,113 B2
(45) Date of Patent: Oct. 10, 2017

(54) METHOD OF FABRICATING A TURBINE OR COMPRESSOR GUIDE VANE SECTOR MADE OF COMPOSITE MATERIAL FOR A TURBINE ENGINE, AND A TURBINE OR A COMPRESSOR INCORPORATING SUCH GUIDE VANE SECTORS

(71) Applicants: HERAKLES, Le Haillan (FR); SNECMA, Paris (FR)

(72) Inventors: Eric Fremont, Merignac (FR); Antoine Beaujard, Vaux-le-penil (FR); Romain Nunez, Martignas sur Jalle (FR)

(73) Assignees: HERAKLES, Le Haillan (FR); SNECMA, Paris (FR)

( * ) Notice: Subject to any disclaimer, the term of this patent is extended or adjusted under 35 U.S.C. 154(b) by 820 days.

(21) Appl. No.: 14/354,239

(22) PCT Filed: Oct. 23, 2012

(86) PCT No.: PCT/FR2012/052422
§ 371 (c)(1),
(2) Date: Apr. 25, 2014

(87) PCT Pub. No.: WO2013/060977
PCT Pub. Date: May 2, 2013

(65) Prior Publication Data
US 2014/0314556 A1    Oct. 23, 2014

(30) Foreign Application Priority Data
Oct. 25, 2011   (FR) ...................................... 11 59668

(51) Int. Cl.
*F03B 1/04*     (2006.01)
*F01D 9/04*     (2006.01)
(Continued)

(52) U.S. Cl.
CPC ............ *F01D 9/044* (2013.01); *B23K 1/0018* (2013.01); *B29C 70/222* (2013.01);
(Continued)

(58) Field of Classification Search
CPC .... B29C 70/222; B29C 70/24; D03D 25/005; B29B 11/16; F01D 5/282; F01D 5/284;
(Continued)

(56) References Cited

U.S. PATENT DOCUMENTS 5,071,679 A    12/1991   Heraud et al.
5,246,736 A     9/1993   Goujard et al.
(Continued)

FOREIGN PATENT DOCUMENTS

EP    1335113 A1    8/2003
EP    2154119 A1    2/2010
(Continued)

OTHER PUBLICATIONS

International Search Report for corresponding International PCT Application No. PCT/FR2012/52422, mailed on Apr. 23, 2013.

*Primary Examiner* — Jason Shanske
*Assistant Examiner* — Kelsey Stanek
(74) *Attorney, Agent, or Firm* — Workman Nydegger

(57) ABSTRACT

Single-airfoil vanes each having an inner platform, an outer platform, and an airfoil are obtained by three-dimensionally weaving a fiber blank in a single piece, by shaping the fiber blank to obtain a single-piece fiber preform, and by densifying the preform with a matrix to obtain a vane of composite material forming a single piece with inner and outer platforms incorporated therein. A plurality of vanes is assembled together at an intermediate stage of densification to form a multi-airfoil composite material guide vane sector for a turbine nozzle or a compressor diffuser and the assembled-together vanes are bonded together.

22 Claims, 14 Drawing Sheets

(51) Int. Cl.
  *F01D 5/28* (2006.01)
  *B23K 1/00* (2006.01)
  *B29D 99/00* (2010.01)
  *F01D 25/24* (2006.01)
  *F04D 29/40* (2006.01)
  *B29C 70/22* (2006.01)
  *B29C 70/24* (2006.01)
  *B29L 31/08* (2006.01)

(52) U.S. Cl.
  CPC ......... *B29D 99/0025* (2013.01); *F01D 5/282* (2013.01); *F01D 5/284* (2013.01); *F01D 9/04* (2013.01); *F01D 9/041* (2013.01); *F01D 25/24* (2013.01); *F04D 29/403* (2013.01); *B29C 70/24* (2013.01); *B29L 2031/082* (2013.01); *F05D 2230/237* (2013.01); *F05D 2300/603* (2013.01); *F05D 2300/6033* (2013.01); *Y10T 29/49323* (2015.01)

(58) Field of Classification Search
  CPC ............ F01D 9/044; F01D 9/04; F01D 9/041; F01D 25/24; C04B 35/571; C04B 35/62868; C04B 35/62873; C04B 35/62884; C04B 35/62894; C04B 35/62897; B29D 99/0025; Y02T 50/67; Y02T 50/672; B23K 1/0018; F04D 29/403; Y10T 29/49323
  USPC .................. 415/200, 196, 173.4, 183, 208.1; 264/103
  See application file for complete search history.

(56) References Cited

U.S. PATENT DOCUMENTS

| | | | |
|---|---|---|---|
| 5,965,266 | A | 10/1999 | Goujard et al. |
| 7,290,982 | B2 | 11/2007 | Girard et al. |
| 7,926,761 | B2 | 4/2011 | Coupe et al. |
| 8,221,836 | B2 | 7/2012 | Philippe et al. |
| 8,607,454 | B2 | 12/2013 | Blanchard et al. |
| 8,685,868 | B2 | 4/2014 | Bouillon et al. |
| 2003/0146578 | A1 | 8/2003 | Girard et al. |
| 2005/0042081 | A1 | 2/2005 | Girard et al. |
| 2007/0007386 | A1 | 1/2007 | Coupe et al. |
| 2010/0015428 | A1 | 1/2010 | Philippe et al. |
| 2010/0144227 | A1 | 6/2010 | Coupe et al. |
| 2011/0293828 | A1 | 12/2011 | Eberling-Fux et al. |
| 2011/0311368 | A1 | 12/2011 | Coupe et al. |
| 2012/0055609 | A1 | 3/2012 | Blanchard et al. |
| 2012/0099982 | A1 | 4/2012 | Coupe et al. |
| 2012/0196107 | A1 | 8/2012 | Philippe et al. |
| 2013/0089429 | A1 | 4/2013 | Nunez et al. |

FOREIGN PATENT DOCUMENTS

| | | |
|---|---|---|
| FR | 2664518 A1 | 1/1992 |
| FR | 2745808 A1 | 9/1997 |
| FR | 2939129 A1 | 6/2010 |
| FR | 2939130 A1 | 6/2010 |
| FR | 2943942 A1 | 10/2010 |
| FR | 2946999 A1 | 12/2010 |
| FR | 2953885 A1 | 6/2011 |
| WO | 2006136755 A2 | 12/2006 |
| WO | 2010061140 A1 | 6/2010 |
| WO | 2010116066 A1 | 10/2010 |
| WO | 2010146288 A1 | 12/2010 |
| WO | 2011080443 A1 | 7/2011 |
| WO | 2012001269 A1 | 1/2012 |
| WO | 2012001278 A1 | 1/2012 |

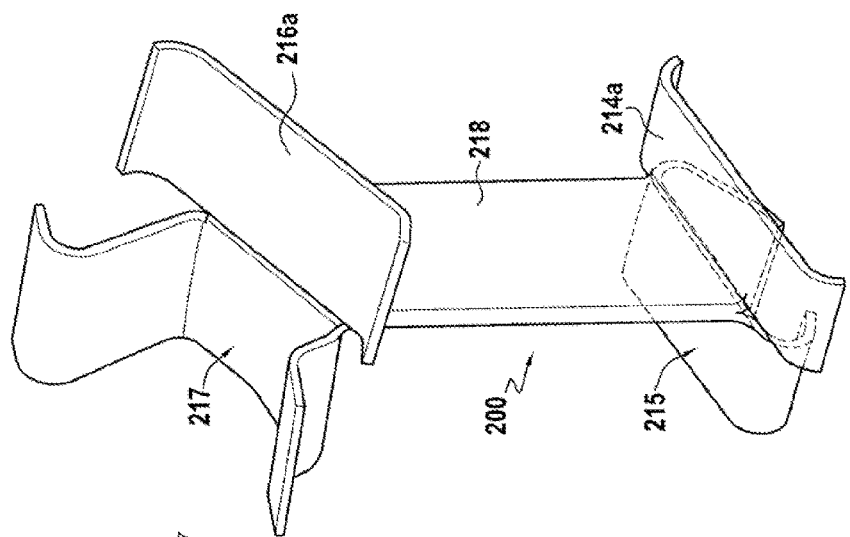
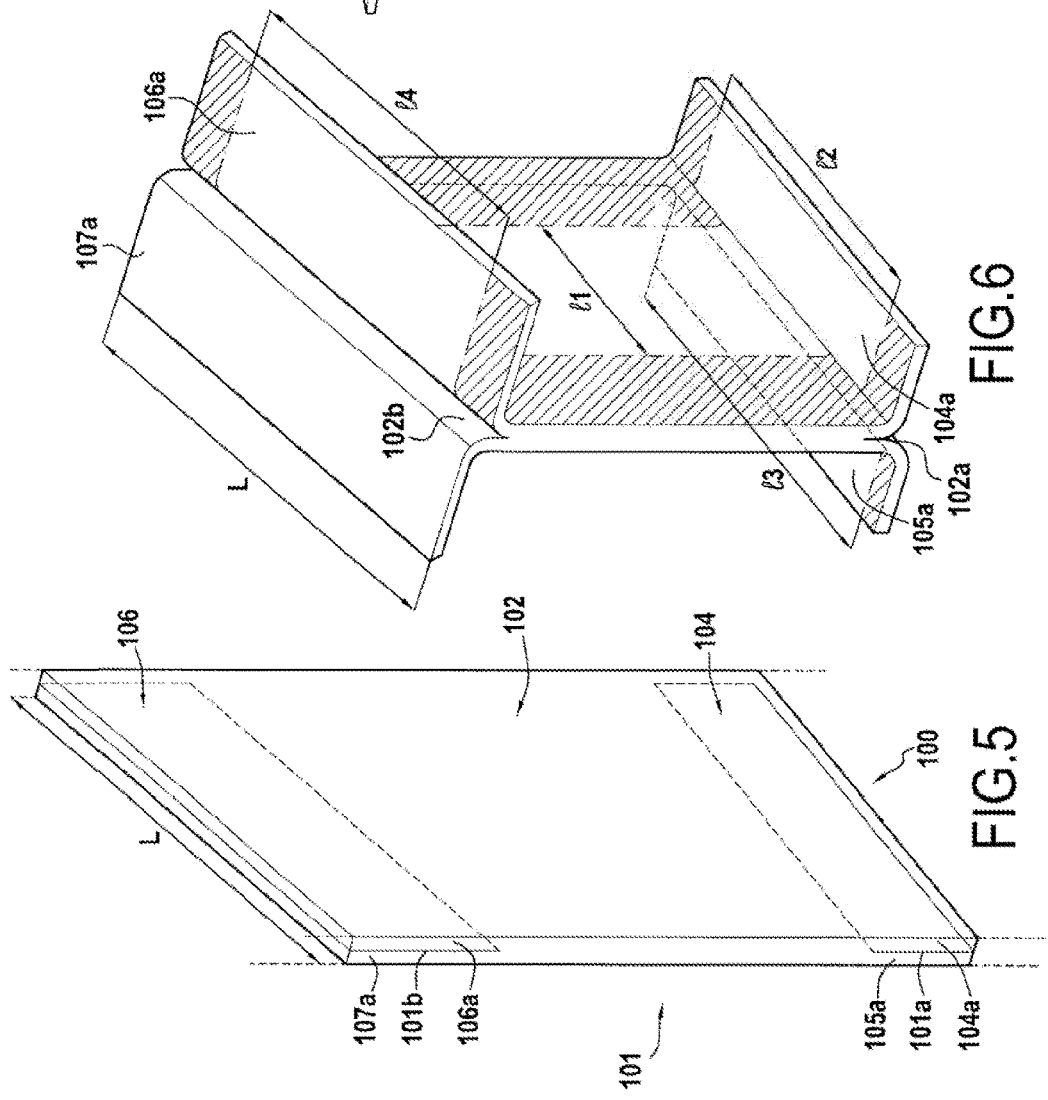

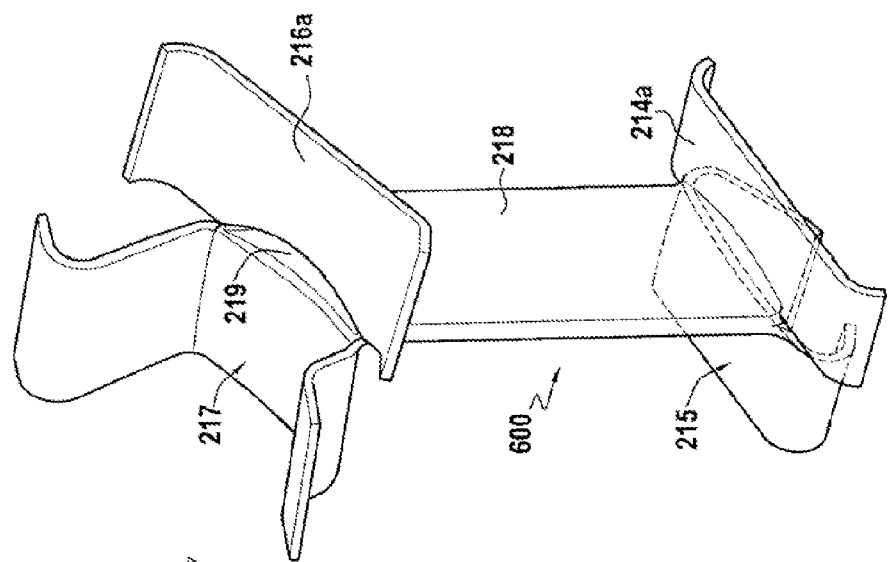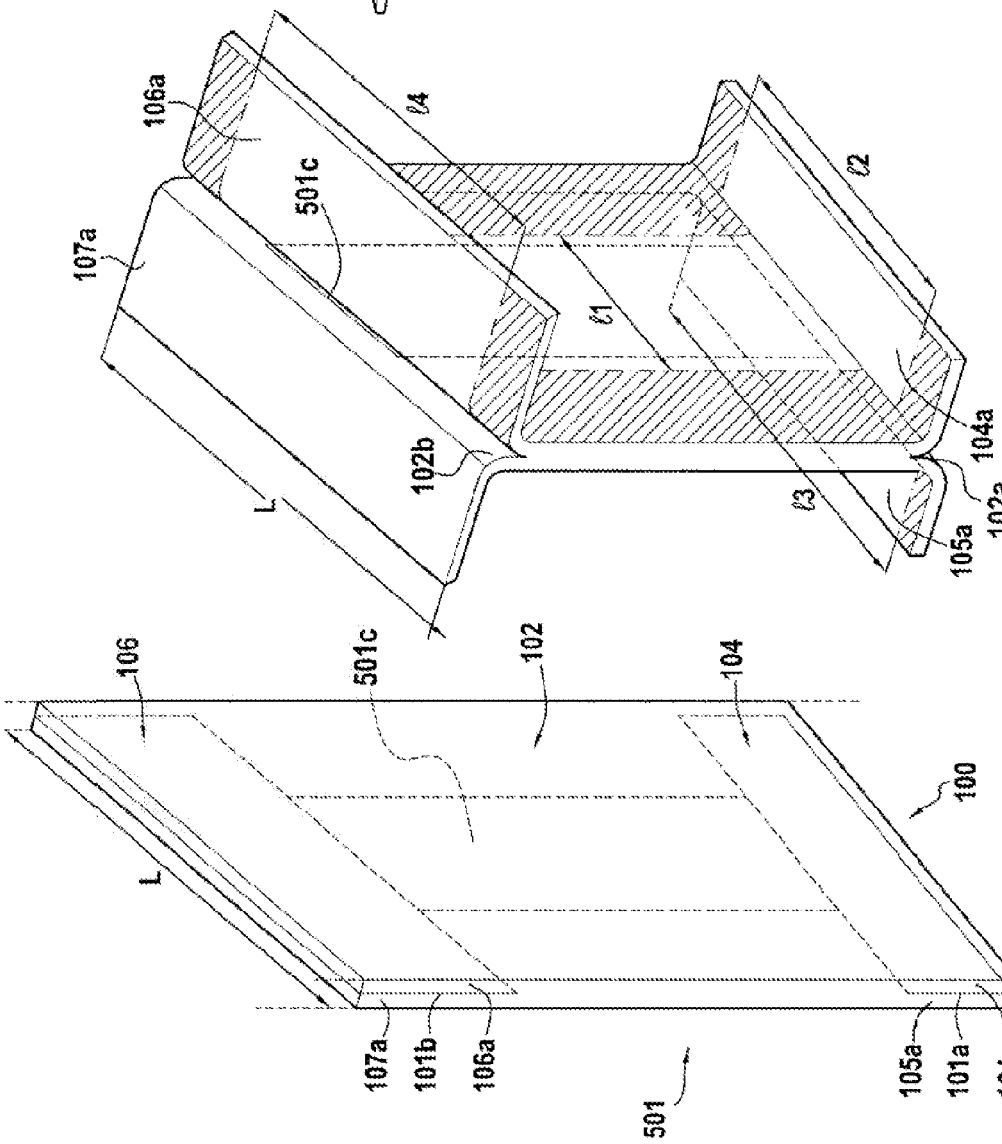

METHOD OF FABRICATING A TURBINE OR COMPRESSOR GUIDE VANE SECTOR MADE OF COMPOSITE MATERIAL FOR A TURBINE ENGINE, AND A TURBINE OR A COMPRESSOR INCORPORATING SUCH GUIDE VANE SECTORS

BACKGROUND OF THE INVENTION

The invention relates to turbines or compressors for turbine engines, in particular for aeroengines or for industrial turbines.

Improving the performance of turbine engines and reducing their polluting emissions leads to ever-higher operating temperatures being envisaged.

For hot portion elements of turbine engines, proposals have thus been made to use ceramic matrix (CMC) materials. These materials possess remarkable thermostructural properties, i.e. mechanical properties that make them suitable for constituting structural elements together with the capacity for conserving these properties at high temperatures. Furthermore, CMC materials present density that is well below that of the metal materials conventionally used for hot portion elements of turbine engines.

Thus, Documents WO 2010/061140, WO 2010/116066, and WO 2011/080443 describe making rotor wheel blades for turbine engines out of CMC, which blades have incorporated inner and outer platforms.

The use of CMC materials for turbine nozzles has also been proposed in particular in Document WO 2010/146288. That document describes making multi-airfoil or single-airfoil nozzle sectors out of CMC by densifying a fiber preform obtained by shaping a woven blank, the sectors subsequently being juxtaposed to build up a complete nozzle.

A turbine nozzle or a compressor diffuser made in conventional manner out of metal is built up from a plurality of guide vane sectors that are assembled together, each sector comprising an inner platform, an outer platform, and a plurality of airfoils extending between the inner and outer platforms and secured thereto. The inner and outer platforms define the gas or air flow passage through the nozzle or the diffuser. On the outside, the outer platforms of the sectors are secured to tabs enabling the nozzle or the diffuser to be mounted in a casing.

OBJECT AND SUMMARY OF THE INVENTION

The invention seeks to propose a method making it possible to fabricate a turbine nozzle or a compressor diffuser sector out of composite material that reproduces the various functions of a metal sector, and in particular the function of defining the gas or air flow passage by means of inner and outer platforms, and the function of attaching the sector in a casing.

This object is achieved by a method comprising:

a) making a plurality of single-airfoil vane units, each vane having inner and outer platforms and an airfoil extending between the platforms and connected thereto, and being made by:

forming a fiber blank by three-dimensional weaving, the blank being in the form of a strip and comprising a first segment with second and third segments extending the first segment at respective first and second longitudinal ends thereof, each of the second and third segments being split into two portions on either side of a zone of non-interlinking extending within the thickness and across the entire width of the strip;

forming a fiber preform for the vane to be made by laterally deploying the two portions of the second segment and the two portions of the third segment and shaping said portions so as to obtain inner and outer platform preforms, and by shaping the first segment so as to obtain an airfoil preform; and at least partially densifying the fiber preform with a matrix in order to obtain an at least partially densified vane with inner and outer platforms incorporated therein; and b) assembling and bonding together a plurality of at least partially densified vanes:

the bonding being performed by a process comprising at least one step selected from: a step of bonding by brazing and a step of bonding by co-densification; and the inner or outer platform of a first vane comprising an inner or outer passage-constituting platform portion that is bonded to an inner or outer platform portion of an adjacent second vane in a bonding zone extending over at least a portion of the inside surface of the inner passage-constituting platform portion of the first vane and/or over at least a portion of inner surface of the outer passage-constituting platform portion of the first vane.

According to a feature of the method, single-airfoil vanes are assembled together, each having at its outer and/or inner platform and on either side of the airfoil, a single single-function platform portion; and at the outer and/or inner platform, a single platform portion situated on a first side of the airfoil is engaged on the inside or the outside of a single platform portion situated on the second side of a second vane adjacent to the first.

Starting from single-airfoil vanes, each having only single single-function platform portions on either side of the airfoil, it is thus possible to build up a sector having an outer platform and/or an inner platform with two functions.

Advantageously, the making of each vane includes a step of partially densifying the fiber preform with a matrix, followed by a step of machining.

A plurality of partially densified machined vanes may be assembled and bonded together by co-densification. Under such circumstances, for making a nozzle or diffuser sector out of ceramic matrix composite material, provision may be made for the partially densified machined vanes to be assembled together by means of a pre-ceramic adhesive bonding step.

In a variant, for making a nozzle or diffuser sector out of ceramic matrix composite material, the making of each vane includes first and second steps of densification by means of a ceramic matrix, which steps are separated by a step of machining, and the bonding together of a plurality of vanes includes a step of brazing assembled-together vanes after the second densification step.

In an implementation, one of the two portions of the third segment of the fiber strip is deployed and shaped in order to form a preform for an outer passage-constituting platform portion on one side of the airfoil preform and the other portion of the third segment of the fiber strip is deployed and shaped in order to form a preform for a portion of a set of attachment tabs on the other side of the airfoil preform, the preforms for the outer passage-constituting platform portion and for the set of attachment tabs being attached to the airfoil preform at positions that are mutually offset in the longitudinal direction, such that when two adjacent vanes are assembled together a portion of the outer passage-constituting platform portion of one of the two vanes engages the inside of a portion of the set of attachment tabs of the other one of the two vanes.

In an implementation, one of the two portions of the second fiber strip segment is deployed and shaped in order to form a preform for an inner passage-constituting platform portion on one side of the airfoil preform, and the other portion of the second fiber strip segment is deployed and shaped in order to form a preform for a portion of a set of hooks on the other side of the vane preform, the preforms for the inner passage-constituting platform portions and for the set of hooks being connected to the airfoil preform at positions that are mutually offset in the longitudinal direction in such a manner that when assembling two adjacent vanes together, an inner passage-constituting platform portion of one of the two vanes engages on the outside of a portion of a set of hooks of the other one of the two vanes.

In an implementation, the method comprises assembling and bonding together first single-airfoil vanes alternating with second single-airfoil vanes, and:

the making of each first vane comprises deploying and shaping the two portions of the third fiber strip segment in order to form a preform for an outer passage-constituting platform portion on either side of the airfoil preform; and the making of each second vane comprises deploying and shaping the two portions of the third fiber strip segment to form a preform for a set of attachment tabs portion on either side of the airfoil preform;

an outer passage-constituting platform portion of a first vane being engaged on the inside of a set of attachment tabs portion of a second vane during assembly of the vane.

In an implementation, the method comprises assembly and bonding together first single-airfoil vanes in alternation with second single-airfoil vanes, and:

the making of each first vane comprises deploying and shaping the two portions of the second fiber strip segment to form a preform for an inner passage-constituting platform portion on either side of the airfoil preform; and the making of each second vane comprises deploying and shaping the two portions of the second fiber strip segment to form a preform for a set of hooks portion on either side of the airfoil preform;

an inner passage-constituting platform portion of a first vane being engaged on the outside of a set of hooks portion of a second vane when assembling the vanes together.

In an implementation, the first segment of the fiber blank is woven while leaving an internal zone of non-interlinking that extends over the entire longitudinal dimension of the first segment and that communicates at its ends with the zones of non-interlinking in the second segment and in the third segment, and the shaping of the first segment includes forming a passage along the zone of non-interlinking in the first segment in order to obtain a hollow airfoil preform.

The invention also provides a turbine engine turbine having a turbine casing and a turbine nozzle made of CMC material, the turbine casing having nozzle sectors obtained by a method as defined above. The nozzle is advantageously mounted in the turbine casing by means of attachment tabs presented on the vane outer platforms.

The invention also provides a turbine engine compressor having a compressor casing and at least one compressor diffuser made of composite material, the compressor diffuser having diffuser sectors obtained by a method as defined above. The diffuser is advantageously mounted in the casing of the compressor by means of attachment tabs presented by the vane outer platforms.

Advantageously, the nozzle and the diffuser support respective abradable material support rings via hooks that are presented by the vane inner platforms.

The invention is remarkable in that fabricating nozzle or diffuser sectors out of composite material from single-airfoil vane units makes it possible to simplify the preparation and the molding of fiber preforms in comparison with a complex preform for a multi-airfoil sector of a nozzle or a diffuser.

The invention is also remarkable in that the nozzle or the diffuser may be attached in the turbine or compressor casing by means of attachment tabs associated with vane units, and the forces exerted on the airfoils can be taken up by the attachment tabs without inducing excessive forces on the bonds between the vanes.

The invention also provides turbine engine having a turbine and/or a compressor as defined above.

BRIEF DESCRIPTION OF THE DRAWINGS

The invention can be understood on reading the following description made by way of non-limiting indication with reference to the accompanying drawings, in which:

FIGS. 5 to 7 show, in highly diagrammatic manner, successive steps in a method of making a fiber preform for a nozzle vane such as that of FIG. 2;

FIGS. 15 to 17 show, in highly diagrammatic manner, successive steps of a method of making a fiber preform for a vane such as that of FIG. 13.

DETAILED DESCRIPTION OF EMBODIMENTS

Definitions

Throughout the text, the terms "outer platform" and "inner platform" cover equally well either a two-function platform having both a portion forming a platform for constituting a gas-flow passage and also a portion forming attachment tabs or hooks or lips, or else a single-functional platform having only one of those portions.

The term "passage-constituting platform" designates an element forming a portion of an outer or an inner wall that defines the passage in which gas flows through a turbine in a turbine nozzle, or the passage in which air flows through a compressor in a compressor diffuser.

Application to a Turbine Engine Turbine

Figure 1:
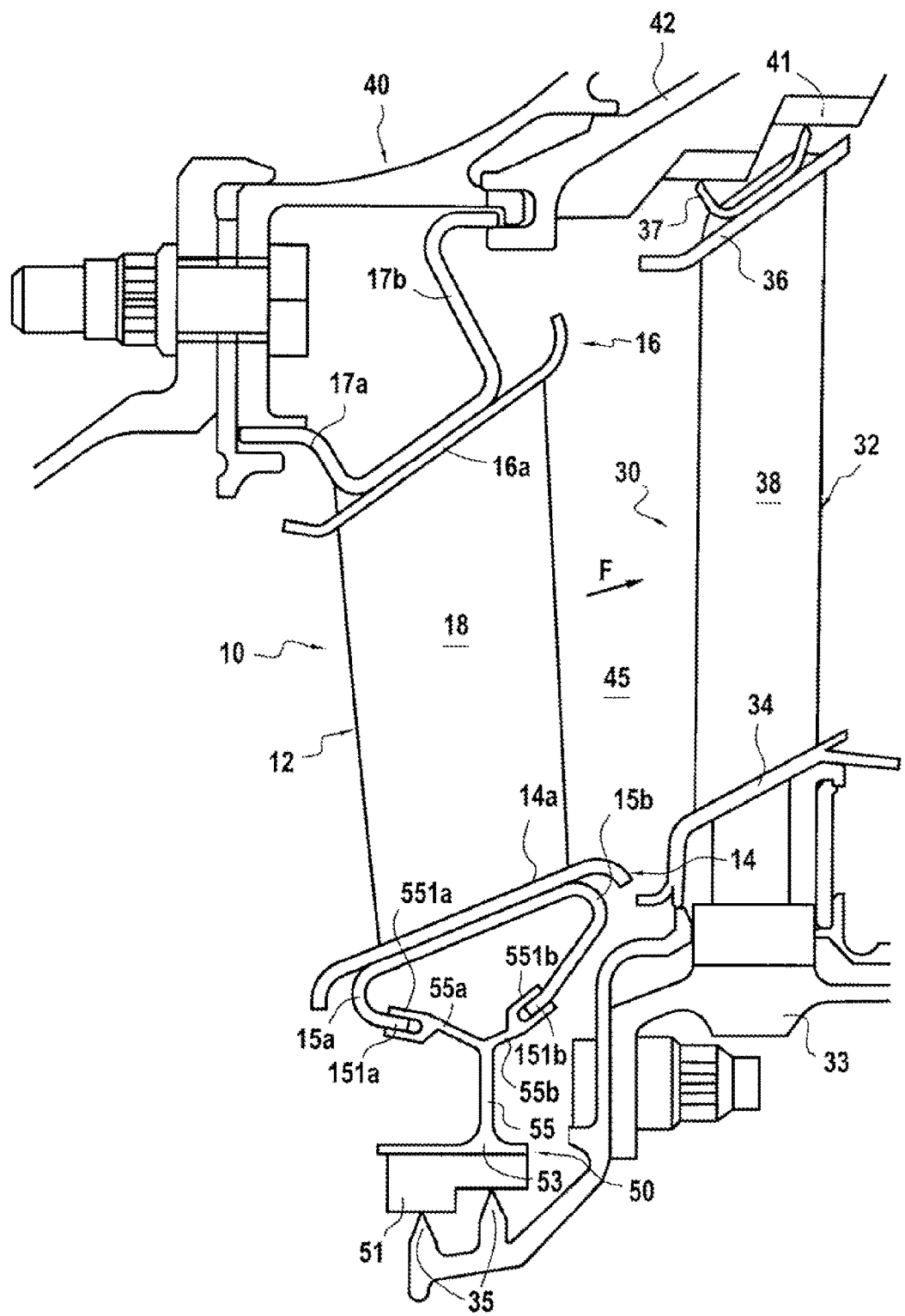
FIG. 1 is a highly diagrammatic fragmentary view in axial half-section of a low pressure turbine of a turbine engine including a turbine nozzle made of CMC material.

As shown in part in FIG. 1, a multi-stage low pressure (LP) turbine of a turbine engine, e.g. an aeroengine, comprises a plurality of stationary nozzles 10 alternating with rotary wheels 30 in the flow direction of the gas stream through the turbine (arrow F) and mounted inside a turbine casing 40.

Each rotary wheel 30 has a plurality of blades 32, each having an inner platform 34, an outer platform 36, and an airfoil 38 extending between the platforms 34 and 36 and connected thereto. On the inside of the platform 34, the blade is extended by a root engaged in a housing in a disk 33. On the outside, the outer platform 36 supports wipers 37 facing an abradable material 41 carried by a sectorized ring 42 for providing sealing at the tips of the blades 32.

Throughout the present text, the terms "inner" and "outer" are used with reference to a position or an orientation relative to the axis of the turbine.

The blades 32 may be conventional metal blades or they may be blades made of CMC material, e.g. obtained in the manner described in the above-mentioned Documents WO 2010/061140, WO 2010/116066, or WO 2011/080443.

At least one of the nozzles, such as the nozzle 10 in FIG. 1, is formed by uniting a plurality of annular nozzle sectors made of CMC material.

Each nozzle sector 12 comprises an inner platform 14, an outer platform 16, and a plurality of airfoils 18 extending between the platforms 14 and 16 and secured thereto. The platforms 14 and 16 have portions 14a, 16a forming inner and outer platforms for building up a gas-flow passage. The outer faces of the platforms 14a, 34, and the inner faces of the platforms 16a, 36 define the passage 45 for passing the gas stream through the turbine.

On the outside, upstream and downstream attachment tabs 17a and 17b project from the outer platform 16a, which tabs are in the form of annular sectors of substantially S-shaped section. The terminal portions of the tabs 17a, 17b are oriented respectively upstream and downstream and they are engaged in hooks carried by the casing 40 so as to mount the nozzle 10 in the casing 40 in similar manner to a metal turbine nozzle.

Throughout the text, the terms "upstream" and "downstream" are used with reference to the flow direction of the gas stream through the turbine engine.

On the inside, upstream and downstream hooks 15a and 15b project from the inner platform 14a, which hooks are in the form of annular sectors of substantially C-shaped section, and they are folded respectively downstream and upstream.

The hooks 15a and 15b support and hold in position a sectorized metal ring 50 that supports an abradable material 51 facing wipers 35 carried by the disk 33 in order to provide sealing of the passage 45 on the inside. The metal ring 50 is made up of juxtaposed sectors, each constituting an abradable cartridge. On the outside, each sector of the ring 50 has a base 53 from which a portion 55 projects outwards to form upstream and downstream attachment tabs 55a and 55b. The attachment tabs 55a and 55b are in the form of annular sectors that extend in this embodiment over the same angle as the sectors of the ring 50. In the example shown, mutual engagement between the hooks 15s and the attachment tabs 55a, and also between the hooks 15b and the attachment tabs 55b is achieved by engaging terminal portions 151a, 151b of the hooks 15a, 15b in respective slideways 551a, 551b formed at the ends of the attachment tabs 55a, 55b.

First Embodiment: Vanes with Two-Function Platforms

Figure 2:
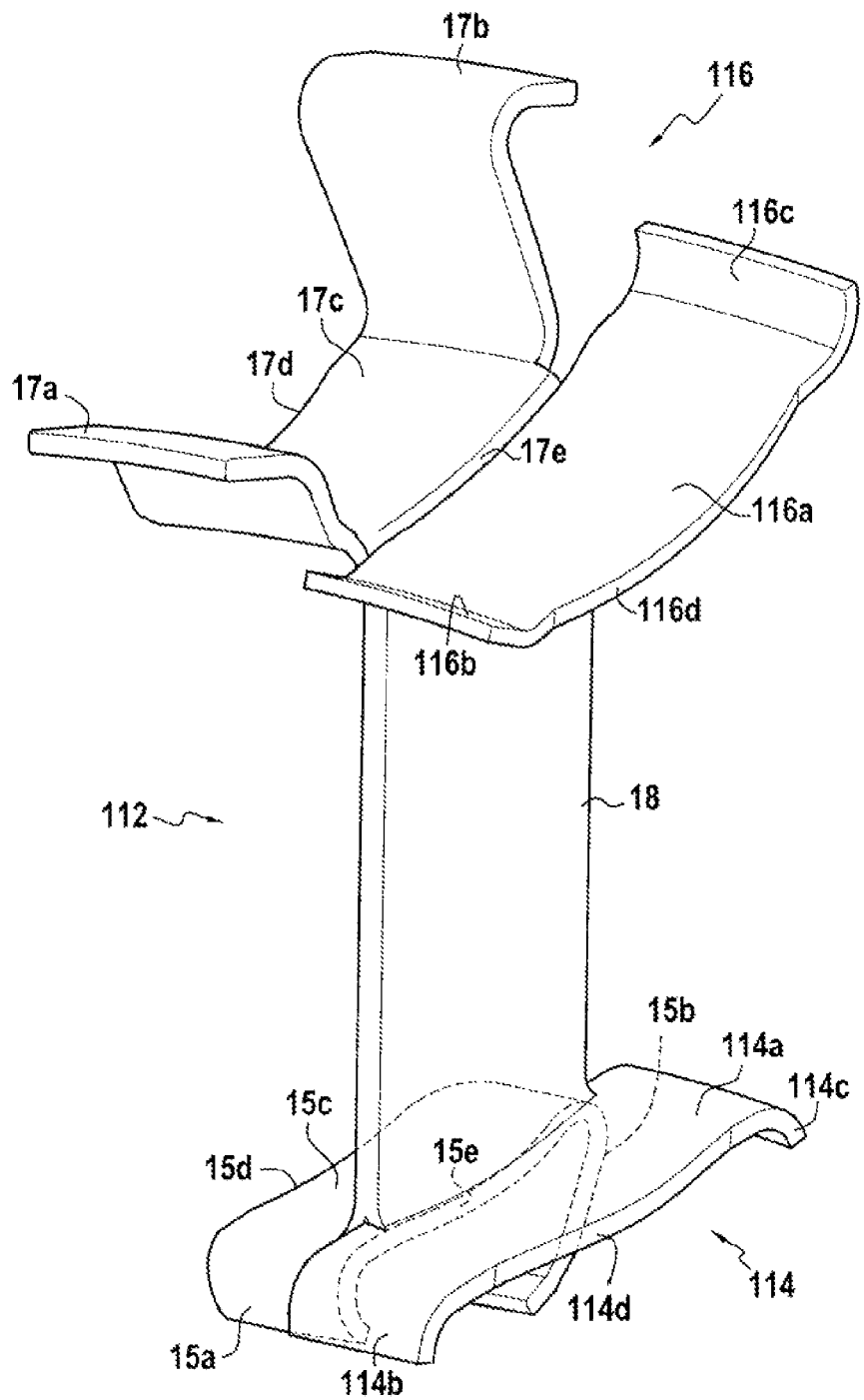
FIG. 2 is a perspective view of a single-airfoil nozzle vane for making up a nozzle sector made of CMC material in an embodiment of the invention.

In a first embodiment, the sectors of a nozzle such as the nozzle 12 in FIG. 1 are formed by assembling together single-airfoil vane units such as the vane 112 of FIG. 2. The vane 112 comprises an inner platform 114, an outer platform 116, and a single airfoil 18 of curved profile extending between the platforms 114 and 116, and secured thereto.

On one side of the airfoil 18, e.g. on the suction side, the platform 114 has a single platform portion 114a that constitutes the inner platform for constituting the passage 45, and on the other side of the airfoil 18, it has a single platform portion constituting hooks 15a, 15b, such as those in FIG. 1. The hooks 15a, 15b extend inwards from a base portion 15c. At its lateral ends, the passage-constituting platform portion 114a may have inwardly-curved rims 114b, 114c for forming lips that, in co-operation with inner lips of adjacent rotary wheels, contribute to sealing the passage on the inside (FIG. 1).

On one side of the airfoil 18, e.g. on the suction side, the platform 116 has a single platform portion 116a constituting the outer platform for constituting the passage 45, and on the other side of the airfoil 18, it has a single platform portion constituting attachment tabs 17a, 17b such as those of FIG. 1. The attachment tabs 17a, 17b extend outwards from a base portion 17c. At its lateral ends, the passage-constituting platform portion 116a may present outwardly-curved rims 116b, 116c for forming lips.

Figure 3:
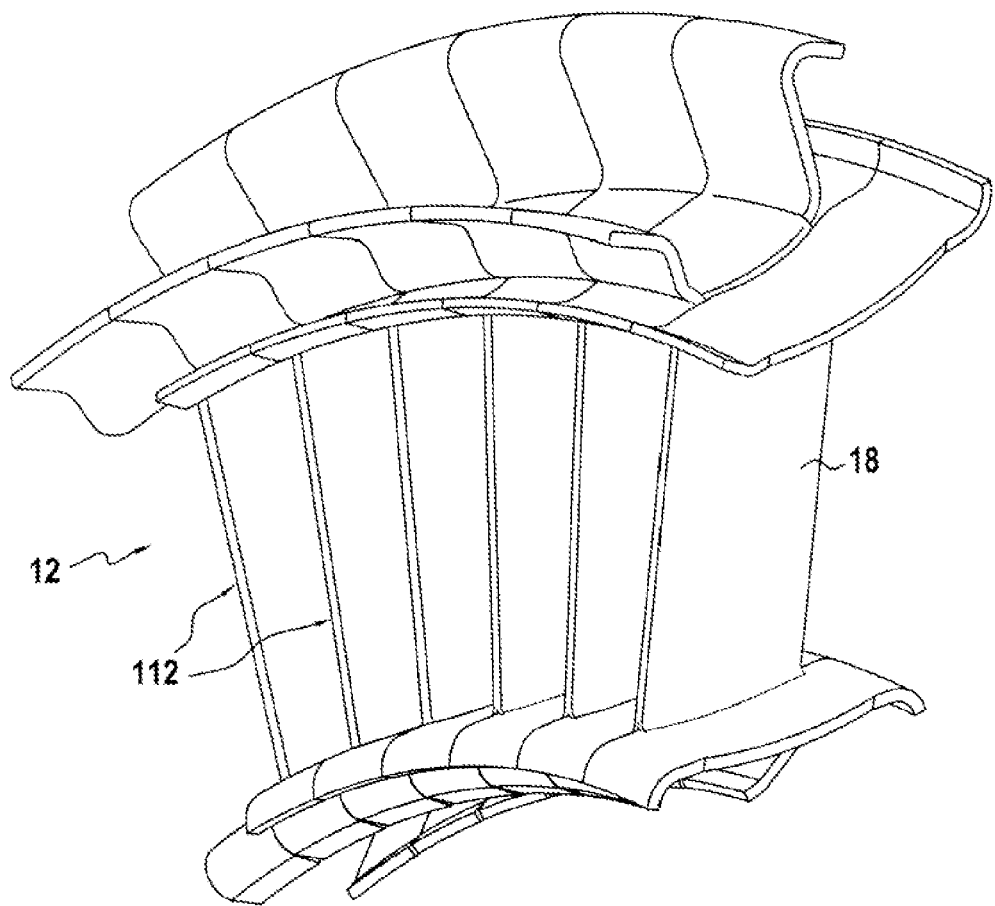
FIG. 3 is a highly diagrammatic perspective view of a nozzle sector obtained by assembling together vanes such as those of FIG. 2.
Figure 4:
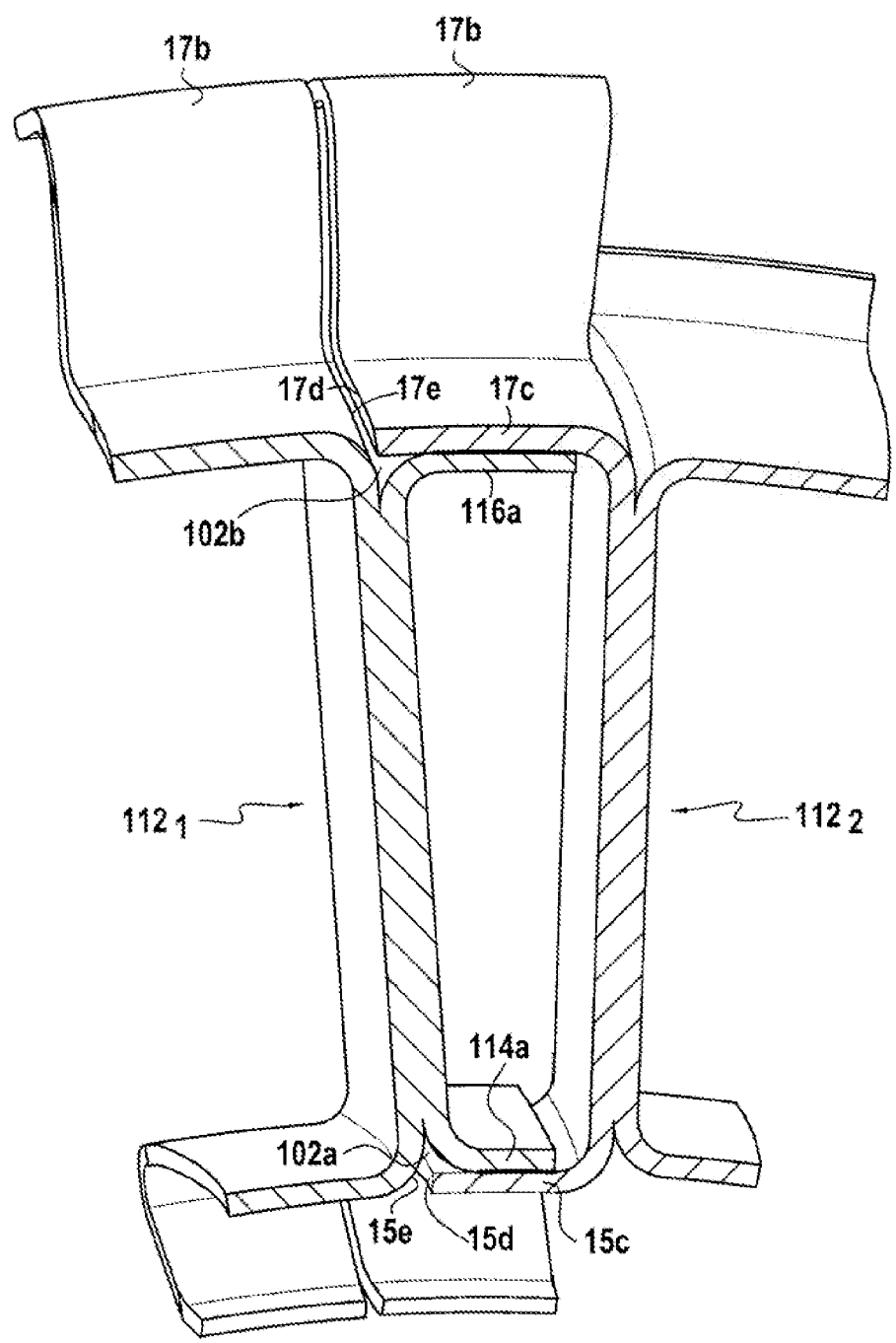
FIG. 4 shows, in highly diagrammatic manner, how two vanes such as those of FIG. 2 are assembled together while fabricating the FIG. 3 nozzle sector.

A nozzle sector 12 is formed by assembling together a plurality of vanes 112 with mutual engagement via the platforms 114, 116, as shown in FIGS. 3 and 4. The number of vanes 112 forming the nozzle sector 12 is six in the example shown. It could naturally be larger or smaller.

The vanes 112 are assembled together by engaging the passage-constituting inner platform portion 114a of a first vane $112_1$ on the outside of the outer surface of the base portion 15c of a second vane $112_2$, and by engaging the passage-constituting outer platform portion 116a of the first vane on the inside of the inner surface of the base portion 17c of the second vane (FIG. 4). The engagement may be achieved with practically no clearance or with clearance that is controlled depending on whether the vanes are connected together by co-densification with a ceramic matrix, or by brazing, as described below. These locations where the airfoil-constituting inner platform portion 114a and the base portion 15c are connected to the airfoil 18 of a vane 112 are mutually offset for this purpose, as are the locations where the passage-constituting outer platform portion 116a and the base portion 17c are connected to the airfoil 18. In addition, the end edges 114d, 116d of the passage-constituting platform portions 114a, 116a may be shaped to correspond substantially to the curved profile of the pressure side face of the airfoil 18, as shown in FIG. 2. In similar manner, the end edges 15d, 17d of the base portions 15c, 17c may be shaped to have a shape that corresponds substantially to the shape of the edges 15e, 17e of the base portions 15c, 17c at their connections with the airfoil 18, as shown in FIG. 2.

In the example shown in FIG. 2, the passage-constituting platform portions 114a, 116a extend from the suction side of the airfoil 18. In a variant, they could be situated on the pressure side, or one of them could be situated on the pressure side and the other on the suction side, the hooks 15a, 15b always being situated on the side of the airfoil 18 that is opposite from the platform portion 114a, and the attachment tabs 17a, 17b always being situated on the side of the airfoil 18 that is opposite from the platform portion 116a.

One way of making a vane 112 such as that shown in FIG. 2 is described below.

FIG. 5 shows in very diagrammatic manner a fiber blank 101 from which a vane fiber preform can be shaped so that, once it has been densified with a matrix and possibly machined, a CMC material vane is obtained such as the vane 112.

The blank 101 is obtained from a strip 100 woven by three-dimensional or multilayer weaving, the strip 100 extending generally in a direction X corresponding to the longitudinal direction of the vane to be made. By way of example, the weaving is performed using warp yarns extending in the direction X, it being understood that weaving with weft yarns extending in this direction is also possible. A plurality of blanks 101 may be woven continuously in the direction X. It is also possible to weave a plurality of parallel rows of blanks 101 simultaneously.

A blank 101 comprises a first segment 102 extended at its longitudinal ends respectively by a second segment 104 and by a third segment 106. The segments 102, 104, and 106 (with only their envelopes being shown in FIG. 5) all including a plurality of layers of warp yarns.

After shaping, the layers of warp yarns in the segment 102 that is to constitute an airfoil preform are interlinked by weft yarns in a plurality of weft yarn layers throughout the thickness of the strip 100. Various weaves may be used, for example weaves of the interlock, multi-satin, or multi-plain type. By way of example, reference may be made to Document WO 2006/136755.

The segment 104 is split into two portions 104a and 105a that are separated by a zone of non-interlinking 101a that extends within the thickness of the strip 100 over the entire width of the strip 100. Each of the portions 104a and 105a comprises a plurality of layers of warp yarns interlinked by weft yarns of a plurality of layers of weft yarns. The same weave may be used as for the segment 102, the weaving of the segment 104 then differing from the weaving of the segment 102 by the absence of weft yarns interlinking the adjacent warp yarn layers of the portions 104a and 105a. Such multilayer weaving with the provision of a zone of non-interlinking is itself well known.

In similar manner to the segment 104, the segment 106 is split into two portions 106a and 107a that are separated by a zone of non-interlinking 101b that extends in the thickness of the strip 100 over entire width of the strip 100.

After a fiber blank 101 has been woven and cut out from the strip 100, the blank 101 is shaped to obtain a vane preform by deploying the portions 104a, 105a on either side of the segment 102, and by likewise deploying the portions 106a, 107a on either side of the segment 102, as shown in FIG. 6.

The segments 104a and 106a are for forming preforms for forming the respective passage-constituting platform portions 114a and 116a. The segment 105a is for forming the preform for the set of hooks 15a, 15b, and also the base portion 15c. The segment 107a is for forming the preform for the set of attachment hooks 17a, 17b and also the base portion 17c. The segment 102 is for forming the preform of the airfoil 18.

The bottoms of the zones of non-interlinking 101a and 101b where they connect with the segment 102 are oriented along a non-zero slope relative to a plane normal to the direction X in order to comply with the shape of the vane to be made, and in particular to comply with the slope angle of the passage-constituting platforms relative to the longitudinal direction of the airfoil.

The thickness of the strip 100 is selected to correspond to the greatest of the thicknesses of the airfoil 18, of the set of hooks 15a, 15b together with the platform portion 114a, and of the set of attachment tabs 17a, 17b together with the platform portion 116a.

The width L of the strip 100 is selected to correspond to the greatest of the dimensions when developed flat of the platform portions 114a, 116a, the set 17a, 17b, 17c, and the set 15a, 15b, 15c, and specifically in the example shown of the set 17a, 17b, 17c.

Furthermore, in order to form the preform of the airfoil 18, the width of the segment 102 is reduced by eliminating portions adjacent to the longitudinal edges of the segment 102 so as to leave remaining only the portion of width $l_1$ as shown in FIG. 6, which portion is of width that corresponds to the width developed flat of the airfoil 18. It should be observed that the weaving with weft yarns in the segment 102 may be limited to the useful portion, the warp yarn segments that are to be eliminated from the portions of the segment 102 that are adjacent to the longitudinal edges not being woven with weft yarns.

In addition, in order to form the preform of the platform portion 114a, the width of the segment 104a is reduced by eliminating portions extending along its lateral edges so as to leave remaining only a portion of width $l_2$ (FIG. 6) corresponding to the dimensioned developed flat of the platform portion 114a. The procedure is similar for the segments 105a and 106a so as to leave remaining only portions of width $l_3$ and $l_4$ corresponding to the dimensions when developed flat of the set 15a, 15b, 15c and of the platform portion 116a. As for the segment 102, weaving with weft yarns in the nozzles 104a, 105a, and 106a may be limited to the portions that are not eliminated.

In FIG. 6, the portions of the blank 101 that are to be eliminated are shown shaded.

The fiber preform 200 of the vane 112 to be made is then obtained by using shaping tooling to perform molding in which the remaining portion of the segment 102 is deformed to obtain the profile of the vane airfoil 18, the remaining portions of the segments 104 and 106 are deformed in order to reproduce shapes similar to those of the inner and outer passage-constituting platform portions 114a and 116a, the remaining portion of the segment 105a is deformed in order to reproduce shapes similar to those of the hooks 15a and 15b, and the segment 107a is deformed in order to obtain shapes similar to the shape of the tabs 117a and 117b. This produces a vane preform 200 (FIG. 7) with preform portions 214a, 216a for the inner and outer passage-constituting platform portions, a preform portion 215 for the hooks 15a, 15b, and for the base portion 15c, a preform portion 217 for the attachment tabs 17a, 17b and the base portion 17c, and a preform portion 218 for the airfoil.

Because of the nature of the fiber material from which they are made, the deployed portions 104a, 105a and 106a, 107a of the segments 104 and 106 are connected to the segment 102 by forming rounded regions. The gaps 102a, 102b of substantially triangular section that result therefrom at the ends of the segment 102 (FIGS. 4 and 6) may optionally be filled in with fiber padding, e.g. using yarn waste, or by means of inserts (not shown).

It should be observed that the steps of making the vane preform 200 from the blank 101 may advantageously be performed after treating the fibers of the blank 101 and impregnating the blank with a consolidation composition as described below with reference to FIG. 8, which gives the successive steps of an implementation of a method enabling a multi-airfoil nozzle sector to be fabricated out of CMC material.

In step 301, a fiber strip 100 is woven by three-dimensional weaving, the strip comprising a plurality of fiber blanks 101, e.g. oriented in the warp direction, with zones of non-interlinking, as shown in FIG. 5. The weaving may be performed using yarns made of ceramic, in particular yarns based on silicon carbide (SiC), e.g. those supplied under the name "Nicalon" by the Japanese supplier Nippon Carbon. Other ceramic yarns could also be used, in particular yarns of refractory oxide, such as yarns based on alumina $Al_2O_3$, in particular for CMC materials of the oxide/oxide type (reinforcing fiber and matrix both made of refractory oxide). It would also be possible to use carbon fiber yarns for a carbon reinforced CMC material.

In a step 302, the fiber strip is treated to eliminate the sizing present on the fibers and the presence of oxide on the surfaces of the fibers. The sizing may be eliminated by heat treatment and the oxide may be eliminated by acid treatment.

In a step 303, a thin layer of embrittlement release interphase coating is formed on the fibers of the fiber strip by chemical vapor infiltration (CVI). By way of example, the interphase material may be pyrolytic carbon PyC, boron nitride BN, or boron doped carbon BC. By way of example, the thickness of the layer that is formed may lie in the range 10 nanometers (nm) to 100 nm in order to conserve a capacity for deformation in the fiber blank.

Steps of eliminating sizing, performing acid treatment, and forming an interphase coating on a substrate of SiC fibers are described in Document U.S. Pat. No. 5,071,679.

In a step 304, the fiber strip is then impregnated with a consolidation composition, typically a carbon precursor resin or a ceramic precursor resin, possibly diluted in a solvent.

After drying (step 305), individual fiber blanks are cut apart (step 306), as shown in FIG. 5.

In a step 307, a blank as cut apart in this way is shaped (as shown in FIGS. 6 and 7) and is placed in tooling, e.g. made of graphite, for shaping the airfoil preform portions, the inner and outer passage-constituting platform preform portions, and the attachment tab and hook preform portions.

Thereafter, the resin is cured (step 308) and then pyrolyzed (step 309), with it being possible for curing and pyrolysis to follow on one from the other by progressively raising the temperature in the tooling.

After pyrolysis, a vane preform is obtained that is consolidated by the pyrolysis resin. The quantity of consolidation resin is selected to be sufficient but not excessive so that the pyrolysis resin bonds together the fibers of the preform so that it can be handled while conserving its shape without the assistance of tooling.

A second layer of embrittlement release interphase coating is formed by CVI, e.g. out of PyC, BN, or BC, preferably having thickness of not less than 100 nm (step 310). Making an interphase coating in two layers one before and the other after consolidation is described in Document EP 2 154 119.

Thereafter, the ceramic matrix of the consolidated preform is densified, e.g. by CVI. The matrix may be made of SiC or it may be a self-healing matrix comprising matrix phases made of boron carbide $B_4C$ or of a ternary Si—B—C system, as described in particular in Documents U.S. Pat. No. 5,246,736 and U.S. Pat. No. 5,965,266. As mentioned above, other types of ceramic matrix may be envisaged, in particular matrices made of refractory oxide, e.g. of alumina, in particular for oxide/oxide type CMC materials. Densification may then be performed by a liquid technique, i.e. by using a liquid precursor of the ceramic matrix to impregnate and by transforming the precursor by chemical treatment, or by using a composition containing the ceramic in powder form to impregnate, and then obtaining the matrix by sintering.

Densification is preferably performed in two steps 311 and 313 that are separated by a step 312 of machining the vane to the desired dimensions, in particular in order to obtain the desired shape for the end edges 114d, 116d of the passage-constituting platform portions 114a, 116a and the end edges 15d, 17d of the base portions 15c, 17c, and possibly in order to obtain the desired profile for the airfoil 18. A vane is then obtained such as the vane 112 of FIG. 2.

The following step 314 consists in uniting and bonding together a plurality of vanes so as to form a multi-airfoil nozzle sector made of CMC material, such as the sector 12 in FIG. 3. The vanes are bonded together by brazing the overlaps between adjacent surfaces of the inner and outer passage-constituting platform portions 114a and 116a of one vane and the base portions 15c, 17c of an adjacent vane. Bonds are thus obtained between the vanes in bonding zones that extend over at least a portion of the inside surfaces of the inner passage-constituting platform portions and over at least a portion of the outside surfaces of the outer passage-constituting platform portions, the extent of the bonding zones serving to provide strong assembly between the vanes. Bonding may optionally also be performed at the profiled end edges 114d, 116d of the passage-constituting platform portions 114a, 116a and the profiled end edges 15d, 17d of the base portions 15c, 17c. The brazing of parts made of CMC material, and in particular of SiC matrix material, is itself known. By way of example, reference may be made to Documents FR 2 664 518 and FR 2 745 808, the content of which is incorporated herein by way of reference, which documents describe various brazing compositions based on nickel and also containing titanium, silicon, and other optional metals such as copper or chromium.

After turbine nozzle sectors have been obtained that are made of CMC material, they are provided with sectors of the abradable material support ring 50, as described above.

A complete turbine nozzle made of CMC material carrying an abradable material support ring is then built up by mounting the nozzle sectors 12 in the turbine casing by means of the attachment tabs 17a, 17b. The number of sectors making up a complete nozzle may for example lie in the range 16 to 40.

Sealing between sectors may optionally be reinforced by means of tongues arranged at the interfaces between adjacent nozzle sectors, as is already well known for metal nozzle sectors.

Figure 9:
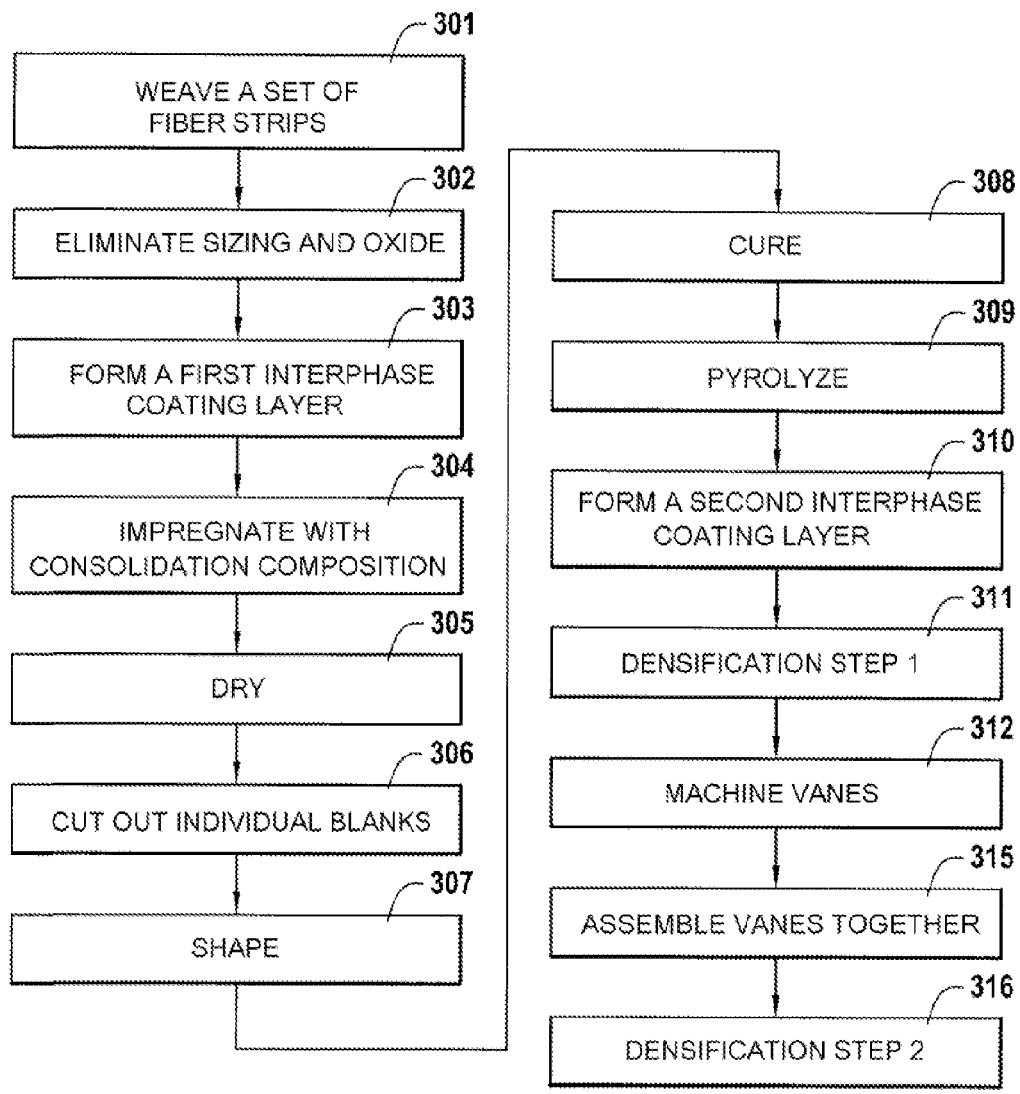
FIG. 9 shows the successive steps of another method of fabricating a nozzle sector such that of FIG. 3.

FIG. 9 shows the successive steps of another method of fabricating a turbine nozzle sector out of CMC.

Figure 8:
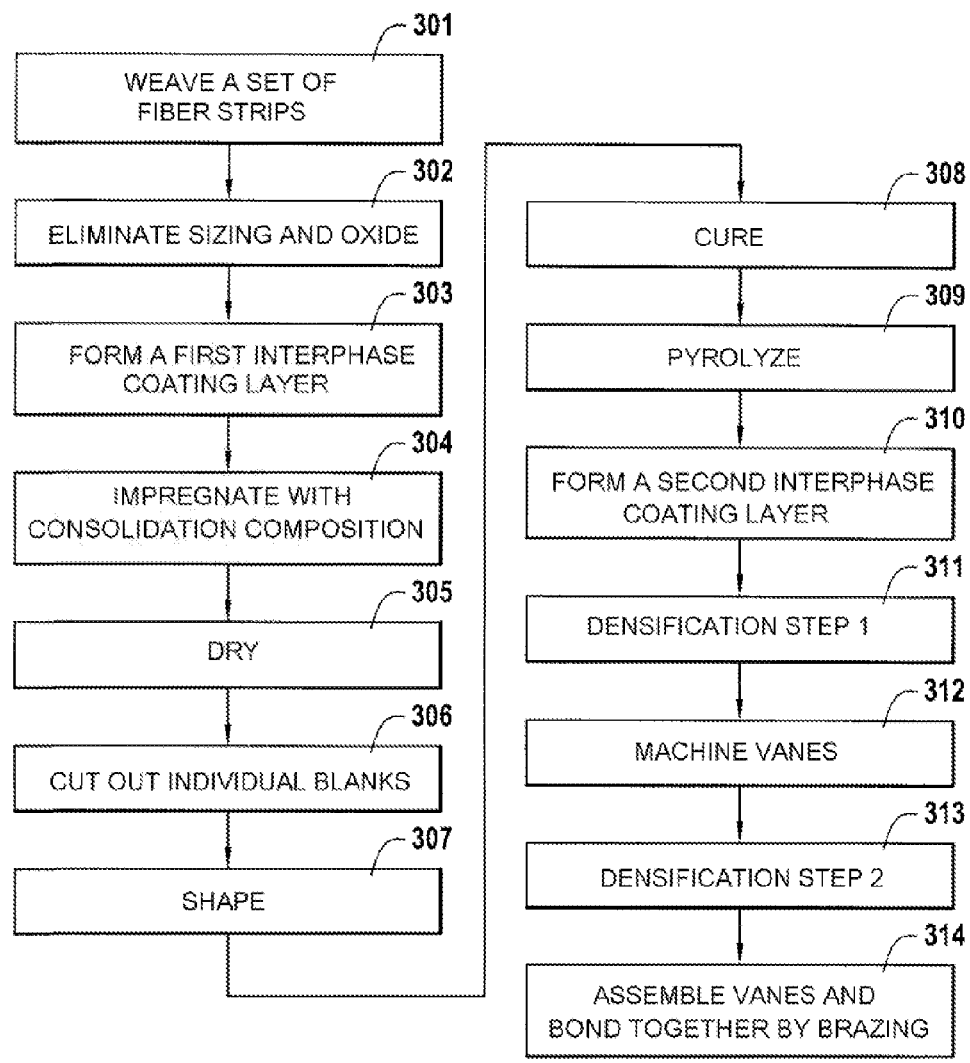
FIG. 8 shows the successive steps of a method of fabricating a nozzle sector such as that of FIG. 3.

Steps 301 to 312 are identical to those of the method of FIG. 8.

After the machining step 312, a plurality of vanes are held together to form a nozzle sector (step 315). The vanes may be assembled together by means of tooling that holds the vanes side by side, and/or by pre-ceramic adhesive bonding, i.e. by bonding by means of a ceramic precursor resin, e.g. a polysilane, polysiloxane, polysilazone, polycarbonsilane, or silicone resin, as is itself known. A second densification or co-densification step is performed on the assembled-together vanes (step 316), similar to the step 313 of the method of FIG. 8, but performed on a complete nozzle sector. When assembly has been performed by pre-ceramic adhesive bonding, the curing and the pyrolysis of the resin in order to transform it into ceramic may be performed during the temperature rise for the second densification step. The bonding between vanes may be achieved in the same zones as when using brazing, in particular in order to have bonds between vanes in bonding zones that extend over at least a portion of the inside surfaces of the inner passage-constituting platform portions and over at least a portion of the outside surfaces of the outer passage-constituting portions.

Figure 10:
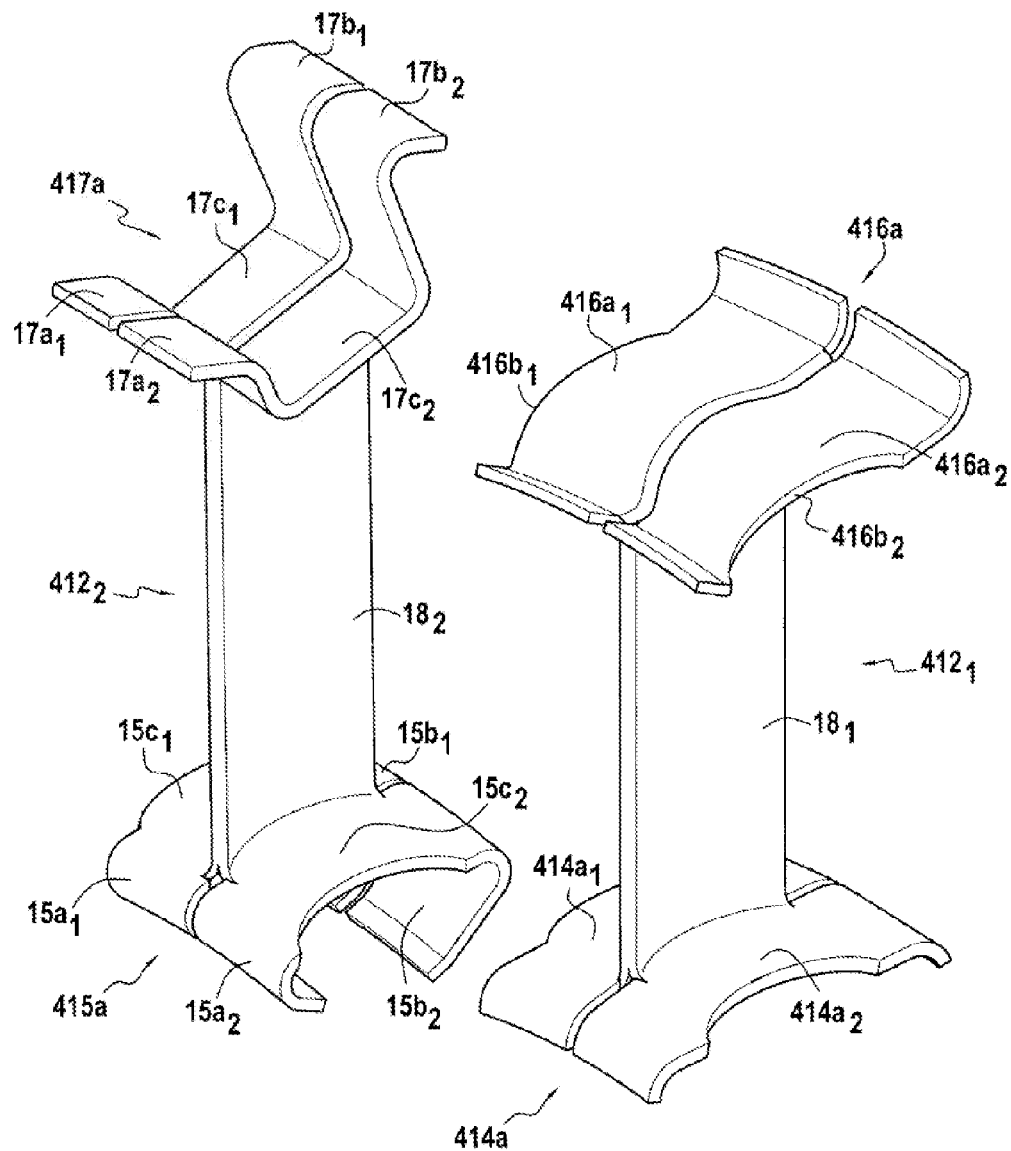
FIG. 10 is a perspective view of two single-airfoil nozzle vanes constituting a nozzle sector made of CMC material, in another embodiment of the invention.

Second Embodiment: Single-Airfoil Vanes with Alternating Single-Function Platforms In a second embodiment (FIG. 10), the nozzle sectors are formed by assembling together single-airfoil vanes $412_1$ in alternation with single-airfoil vanes $412_2$.

Each vane $412_1$ comprises an airfoil $18_1$ extending between an inner platform 414a and an outer platform 416a and secured thereto. The platforms 414a and 416a are limited to passage-constituting platforms, and each of them extends on both sides of the airfoil $18_1$, forming unique platform portions $414a_1$, $414a_2$ and $416a_1$, $416a_2$.

Each vane $412_2$ comprises a airfoil $18_2$ extending between an inner platform 415a and an outer platform 417a and secured thereto.

The inner platform 415a is limited to two single platform portions situated respectively on either side of the airfoil and respectively forming a set comprising a hook $15a_1$, a hook $15b_1$, and a base portion $15c_1$ connecting together the hooks $15a_1$ and $15a_2$, and a set of a hook $15a_2$, a hook $15b_2$, and a base portion $15c_2$ connecting together the hooks $15a_2$ and $15b_2$. The hooks $15a_1$ and $15b_1$ and the hooks $15a_2$ and $15b_2$ extend inwards relative to the respective base portions $15c_1$ and $15c_2$. The hooks $15a_1$ and $15a_2$ have the same profile, and the hooks $15b_1$ and $15b_2$ have the same profile. The function of the hooks $15a_1$, $15b_1$, $15a_2$, and $15b_2$ is similar to the function of the hooks 15a, 15b of the vane 112 of FIG. 2.

The outer platform 417a is limited to two single platform portions situated on respective opposite sides of the airfoil and respectively forming a set comprising an attachment tab $17a_1$, an attachment tab $17b_1$, and a base portion $17c_1$ connecting together the attachment tabs $17a_1$ and $17b_1$, and a set comprising an attachment tab $17a_2$, an attachment tab $17b_2$, an attachment tab $17c_2$, and a base portion $17c_2$ connecting together the attachment tabs $17a_2$ and $17b_2$. The attachment tabs $17a_1$, $17b_1$ and the attachment tabs $17a_2$ and $17b_2$ extend outwards from the respective base portions $17c_1$ and $17c_2$. The attachment tabs $17a_1$ and $17a_2$ have the same profile and the attachment tabs $17b_1$ and $17b_2$ have the same profile. The function of the attachment tabs $17a_1$, $17b_1$, $17a_2$, and $17b_2$ is similar to the function of the attachment tabs 17a, 17b of the vane 112 of FIG. 2.

It should be observed that the distance between the platforms 415a and 417a in the longitudinal direction of the airfoil $18_2$ that connects them together is greater than the distance between the platforms 414a and 416a in the longitudinal direction of the airfoil $18_1$ that connects them together.

Figure 11:
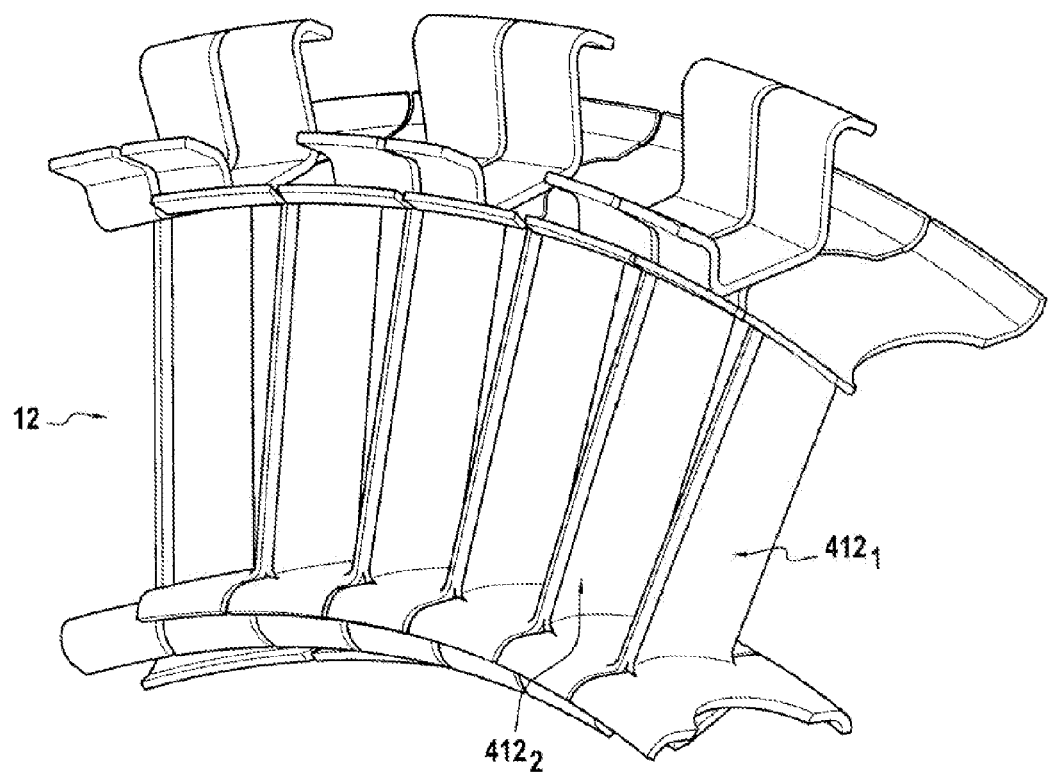
FIG. 11 is a diagrammatic perspective view of a nozzle sector obtained by assembling together vanes such as those of FIG. 10.

A nozzle sector 12 (FIG. 11) is made by assembling together vanes $412_1$ in alternation with vanes $412_2$.

Figure 12:
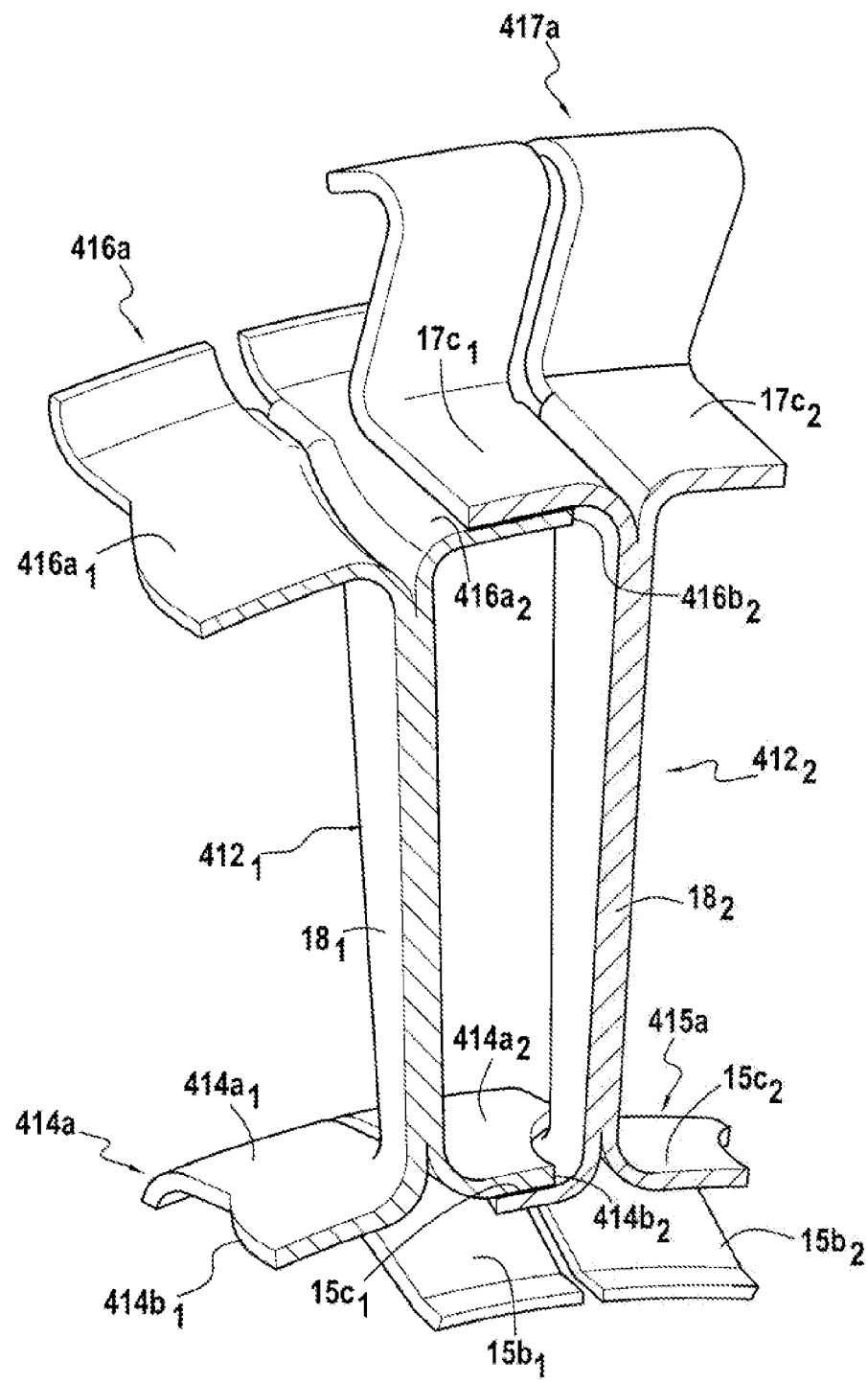
FIG. 12 shows, in highly diagrammatic manner, how two vanes such as those of FIG. 10 are assembled together while fabricating the FIG. 11 nozzle sector.

FIG. 12 shows in very diagrammatic manner two vanes $412_1$ and $412_2$.

The portion $414a_2$ of the inner passage-constituting platform 414a situated beside the pressure side face of the airfoil $18_1$ of the vane $412_1$ comes into contact with or comes close to the base portion $15c_1$ of the vane $412_2$ on its outside in order to enable them to be bonded together by co-densification with a matrix or by brazing (FIG. 12). The edge $414b_2$ may be shaped to fit substantially against the profile of the pressure side face of the airfoil $18_2$ of the vane $412_2$. The portion $414a_1$ of the inner passage-constituting platform 414a situated beside the suction side face of the platform $18_1$ of the vane $412_1$ comes into contact with or close to the base portion $15c_2$ of a vane $412_2$ (not shown), on the outside, for mutual bonding by co-densification with a matrix or by brazing.

The vanes $412_1$ and $412_2$ are assembled together in similar manner at the outer platform 416a, this platform having edges $416b_1$ and $416b_2$ that may be shaped to match the pressure side and suction side profiles of the airfoil $18_2$ of an adjacent vane $412_2$. In this way, the portion $416a_2$ of the outer passage-constituting platform 416a situated beside the pressure side face of the airfoil $18_1$ of the vane $412_1$ comes into contact with or close to the base portion $17c_1$ of the vane $412_2$ on the inside for mutual bonding by co-densification with a matrix or by brazing, while the portion $416a_1$ of the outer passage-constituting platform 416a situated beside the suction side face of the airfoil $18_1$ of the vane $412_1$ comes into contact with or close to the base portion $17c_2$ of the vane $412_2$ (not shown) on the outside for mutual bonding by co-densification with a matrix or by brazing.

Bonds are thus obtained between vanes in bonding zones that extend over at least a portion of the inside surfaces of the inner passage-constituting platform portions and over at least a portion of the outside surfaces of the outside passage-constituting platform portions.

The vanes $412_1$ and $412_2$ are each made by a method similar to that described for the vane 112 of FIG. 2, i.e. by making a fiber blank in the form of a single woven strip having zones of non-interlinking at its two ends in order to form preforms for the passage-constituting platforms 414a, 416a and in order to form preforms for the platforms 415a, 417a that form the sets of hooks and attachment tabs, by deploying and shaping the portions of the blanks that are situated on either side of the zones of non-interlinking.

Third Embodiment: Vanes with Two-Function Platforms and Hollow Airfoils

Figure 13:
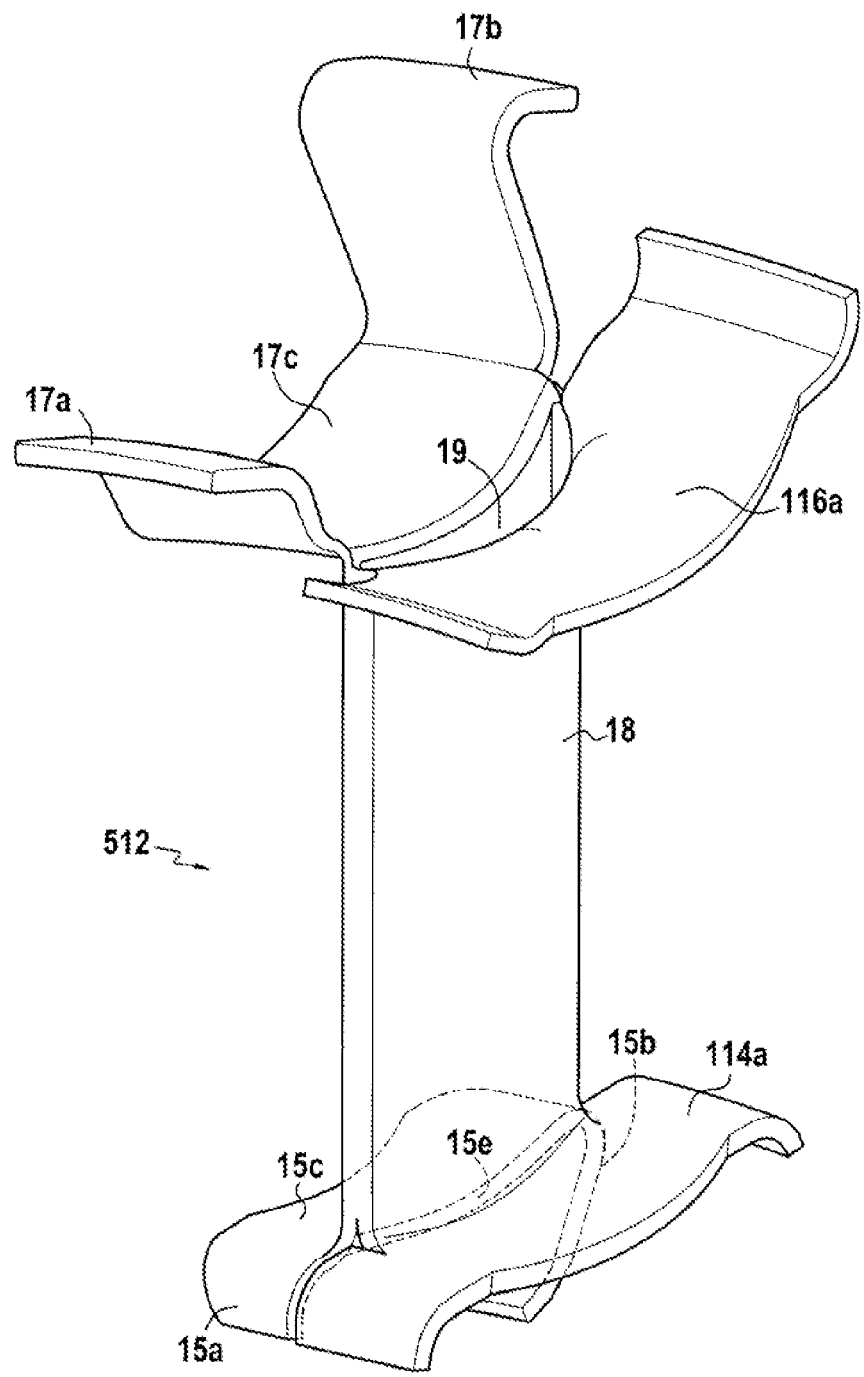
FIG. 13 is a diagrammatic perspective view of a single-airfoil nozzle vane constituting a nozzle sector made of CMC material, in another embodiment of the invention.

In a third embodiment, a nozzle sector is made up of an assembly of single-airfoil vanes 512 such as the vane in FIG. 13.

The vane 512 differs from the vane 112 of FIG. 2 in that the airfoil 18 presents an internal passage 19 running along its entire length and opening out at its longitudinal ends. The other elements constituting the vane 512, i.e. the inner and outer passage-constituting platform portions 114a and 116a, the hooks 15a, 15b on either side of a base portion 15c, and the attachment tabs 17a, 17b on either side of a base portion 17c are similar to those of the vane 112 of FIG. 2, and are not described again.

Figure 14:
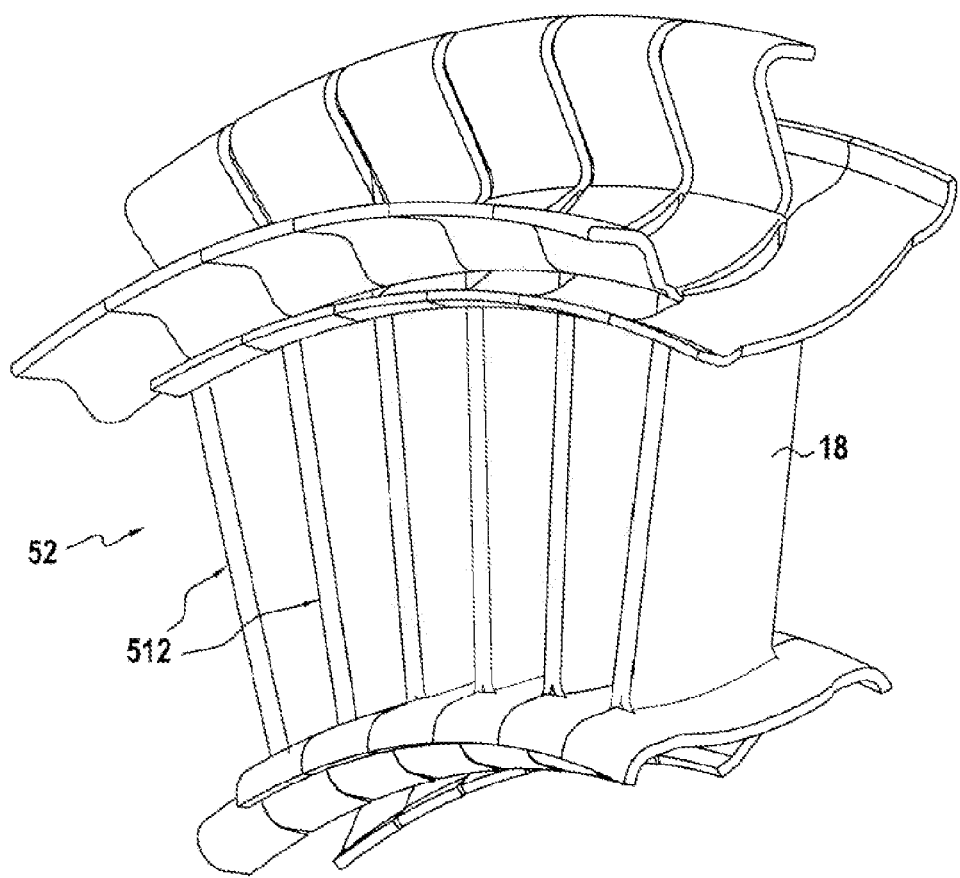
FIG. 14 is a highly diagrammatic perspective view of a nozzle sector obtained by assembling together vanes such as that of FIG. 13.

A plurality of vanes 512 are assembled together in order to form a multi-airfoil turbine nozzle sector 52 as shown in FIG. 14 in a manner similar to the way in which a plurality of vanes 112 are assembled together in order to form the nozzle sector 12 of FIG. 3.

FIGS. 15 to 17 show successive steps of a method of making a fiber preform for a nozzle vane such as the vane 512. Elements in FIGS. 15 to 17 that are common with elements in FIGS. 5 to 7 are given the same references.

A fiber blank 501 (FIG. 15) is obtained from a fiber strip 500 woven by three-dimensional or multilayer weaving. The blank 501 has a first segment 502 extended at one longitudinal end by a second segment 104 split into two portions 104a and 105a that are separated by a zone of non-interlinking 101a, and at the other longitudinal end by a third segment 106 that is split into two portions 106a and 107a that are separated by a zone of non-interlinking 101b. The zones of non-interlinking 101a and 101b extend within the thickness of the strip 100, over its entire width.

The weaving of the blank 501 differs from that of the blank 101 in FIG. 5 in that an internal zone of non-interlinking 501c is arranged within the thickness and along the entire length of the segment 502, the zone of non-interlinking 501c communicating at its longitudinal ends with the zones of non-interlinking 101a and 101b. The zone of non-interlinking 501c is formed in the portion of the segment 502 that is to form the preform for the airfoil 18 so as to be able to form the longitudinal internal passage 19 without making an incision.

As described above with reference to FIG. 6, the blank 501 is shaped by deploying the portions 104a and 105a on either side of the segment 512 and also deploying the portions 106a and 107a in similar manner (FIG. 16). Furthermore, the excess portions of the blank 501 (shaded portions in FIG. 16) are eliminated by being cut off.

The preform 600 of the vane (FIG. 17) is obtained by molding using shaping tooling in order to obtain preforms 214a, 216a for the inner and outer passage-constituting platform portions, preforms 215, 217 for the set of hooks and the set of attachment tabs, and a preform 218 for the airfoil with an internal longitudinal passage 219 formed along the zone of non-interlinking 501c by inserting a tooling element therein.

Other Embodiments

In the description above, it is envisaged providing hooks on the inside of the inner platforms for attachment of an abradable material support ring. Instead of using hooks, it would be possible in a variant to form lips.

In addition, the vanes of the second embodiment could be made using a hollow airfoil, as described for the third embodiment.

Furthermore, the two particular implementations described could be combined by adopting a two-function configuration as in the first embodiment at one of the inner and outer platforms, and a single-function configuration in alternation as in the second embodiment beside the other platform.

In the detailed description above, it is envisaged applying the invention to a low pressure turbine nozzle. Nevertheless, the invention is applicable to turbine nozzles made of CMC for turbine spools other than a low pressure spool, and also to compressor diffusers made of CMC material, in particular compressor stages that are exposed in operation to high temperatures.

Figure 18:
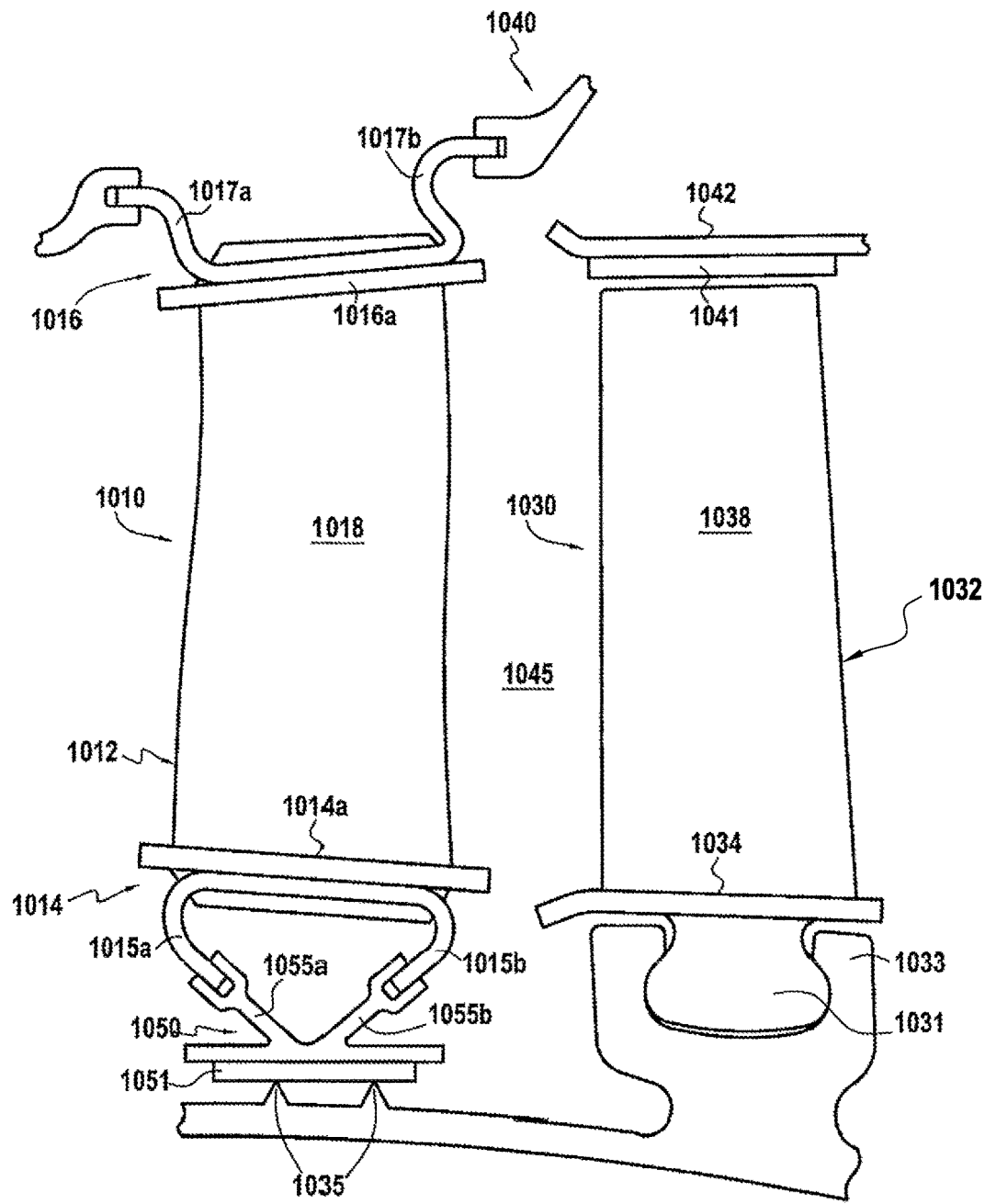
FIG. 18 is a highly diagrammatic fragmentary view in axial half-section of a turbine engine compressor including a compressor diffuser made of composite material.

A multistage compressor of a turbine engine, e.g. an aeroengine, is shown in part and in highly diagrammatic manner in FIG. 18. The compressor, e.g. a high pressure compressor, comprises a plurality of stationary diffusers 1010 that alternate with rotary wheels 1030 that are mounted in a compressor casing 1040.

Each rotary wheel 1030 has a plurality of blades 1032 each with an inner platform 1034 secured to an airfoil 1038. On the inside of the inner platform, each blade 1032 is extended by a root 1031 that is engaged in a housing in a rotor 1033. At their outer ends, the airfoils 1038 of the blades may present wipers (not shown) facing an abradable coating 1041 carried by a sectorized ring 1042 supported by the compressor casing.

At least one of the diffusers, e.g. the diffuser 1010 of FIG. 18, is made by assembling together diffuser sectors 1012 that are made of CMC material.

Each diffuser sector is made up of an assembly of single-airfoil vane units and comprises an inner platform 1014 and an outer platform 1016, the airfoils 1018 extending between the platforms 1014 and 1016 and being secured thereto. The platforms 1014 and 1016 have portions 1014a, 1016a forming inner and outer passage-constituting platforms.

The outer faces of the inner passage-constituting platforms 1014a and the inner faces of the outer passage-constituting platforms 1016a define the passage 1045 for passing the flow of air through the compressor in the diffuser 1010.

On the inside, each platform 1014 presents hooks 1015a, 1015b, and on the outside, each platform 1016 presents attachment tabs 1017a, 1017b.

The terminal portions of the attachment tabs 1017a, 1017b are engaged in hooks carried by the casing 1040 in order to mount the diffuser sectors of the casing 1040.

The hooks 1015a and 1015b support and hold in position a sectorized metal ring 1050 that carries an abradable material 1051 on its inside facing wipers 1035 carried by the rotor 1033.

The metal ring 1050 is made up of juxtaposed sectors extending for example over the same angles as the diffuser sectors and each constituting a cartridge of abradable material. In the same manner as for the ring 50 of FIG. 1, the ring 1050 has attachment tabs 1055a and 1055b on its outside forming slideways at their end into which the terminal portions of the hooks 1015a and 1015b are engaged without being bonded thereto.

The single-airfoil vanes constituting each diffuser sector are made and assembled together in the same manner as described above for the vane units constituting the turbine nozzle sectors.

The description above relates to making a compressor diffuser out of CMC material. When the temperatures encountered in operation are lower, in particular for the upstream stages of the compressor, it is possible to use an organic matrix composite (OMC) material, made using fibers, e.g. carbon fibers or glass fibers together with a polymer matrix.

A diffuser sector made of OMC material is obtained by assembling single-airfoil vanes together.

After weaving a set of fiber strips, cutting out individual blanks, and shaping them by means of shaping tooling, as in the steps 301, 306, and 307 of the method of FIG. 9, each resulting vane preform held in its tooling is impregnated with a resin by injection or by infusion. Heat treatment for curing the resin is performed in order to obtain a partially densified consolidated vane preform. After machining, a plurality of consolidated vane preforms are assembled together and held together by tooling. The assembled together and consolidated preforms are co-densified, with co-densification being performed by at least one cycle of impregnation with a resin and by curing the resin. A final machining operation may optionally be performed. The resin used for consolidating and co-densifying is a precursor resin for the polymer matrix, such as an epoxy, a bimaleimide, or a polyimide resin, for example.

The invention claimed is:

1. A method of fabricating a turbine nozzle or a compressor diffuser for a turbine engine, the method comprising:
    a) making a plurality of single-airfoil vane units, each vane having inner and outer platforms and an airfoil extending between the platforms and connected thereto, and being made by:
        forming a fiber blank by three-dimensional weaving, the blank being in the form of a strip and comprising a first segment with second and third segments extending the first segment at respective first and second longitudinal ends thereof, each of the second and third segments being split into two portions on either side of a zone of non-interlinking extending within the thickness and across the entire width of the strip;
        forming a fiber preform for the vane to be made by laterally deploying the two portions of the second segment and the two portions of the third segment and shaping said portions so as to obtain inner and outer platform preforms, and by shaping the first segment so as to obtain an airfoil preform; and
        at least partially densifying the fiber preform with a matrix in order to obtain and at least partially densified vane with inner and outer platforms incorporated therein; and
    b) assembling and bonding together a plurality of at least partially densified vanes:
        the bonding being performed by a process comprising at least one step selected from: a step of bonding by brazing and a step of bonding by co-densification; and
        the inner or outer platform of a first vane comprising respectively an inner or outer passage-constituting platform portion that is bonded to respectively an inner or outer platform portion of an adjacent second vane in a bonding zone extending respectively over at least a portion of an inside surface of the inner passage-constituting platform portion of the first vane or over at least a portion of an inner surface of the outer passage-constituting platform portion of the first vane.

2. A method according to claim 1, wherein:
single-airfoil vanes are assembled together, each having at respectively its outer or inner platform and on either side of the airfoil, a single single-function platform portion; and
at respectively the outer or inner platform, a single platform portion situated on a first side of the airfoil is engaged on the inside or the outside of a single platform portion situated on a second side of a second vane adjacent to the first vane.

3. A method according to claim 1, wherein the making of each vane includes the step of partially densifying the fiber preform with a matrix, followed by a step of machining.

4. A method according to claim 3, wherein the plurality of partially densified machined vanes are assembled and bonded together by co-densification.

5. A method according to claim 4, for making a nozzle or diffuser sector out of ceramic matrix composite material, wherein assembling together the partially densified machined vanes includes a step of pre-ceramic adhesive bonding.

6. A method according to claim 3, for making a nozzle or diffuser sector out of ceramic matrix composite material,
    wherein the making of each vane includes first and second steps of densification by means of a ceramic matrix, which steps are separated by a step of machining, and
    the bonding together of a plurality of vanes includes the step of brazing assembled-together vanes after the second densification step.

7. A method according to claim 1, wherein one of the two portions of the third segment of the fiber strip is deployed and shaped in order to form a preform for an outer passage-constituting platform portion on one side of the airfoil preform and the other portion of the third segment of the fiber strip is deployed and shaped in order to form a preform for a portion of a set of attachment tabs on the other side of the airfoil preform,
    the preforms for the outer passage-constituting platform portion and for the set of attachment tabs being attached to the airfoil preform at positions that are mutually offset in the longitudinal direction, such that when two adjacent vanes are assembled together a portion of the outer passage-constituting platform portion of one of the two vanes engages the inside of a portion of the set of attachment tabs of the other one of the two vanes.

8. A method according to claim 1,
    wherein one of the two portions of the second fiber strip segment is deployed and shaped in order to form a preform for an inner passage-constituting platform portion on one side of the airfoil preform, and
    the other portion of the second fiber strip segment is deployed and shaped in order to form a preform for a portion of a set of hooks on the other side of the vane preform, the preforms for the inner passage-constituting platform portions and for the set of hooks being connected to the airfoil preform at positions that are mutually offset in the longitudinal direction in such a manner that when assembling two adjacent vanes together, an inner passage-constituting platform portion of one of the two vanes engages on the outside of the portion of a set of hooks of the other one of the two vanes.

9. A method according claim 1, including assembling and bonding together first single-airfoil vanes alternating with second single-airfoil vanes, and:
    the making of each first vane comprises deploying and shaping the two portions of the third fiber strip segment in order to form a preform for an outer passage-constituting platform portion on either side of the airfoil preform; and
    the making of each second vane comprises deploying and shaping the two portions of the third fiber strip segment to form a preform for a set of attachment tabs portion on either side of the airfoil preform;
    an outer passage-constituting platform portion of each first vane being engaged on the inside of the set of attachment tabs portion of each second vane during assembly of the vane.

10. A method according to claim 1, including assembly and bonding together first single-airfoil vanes in alternation with second single-airfoil vanes, and:

the making of each first vane comprises deploying and shaping the two portions of the second fiber strip segment to form a preform for an inner passage-constituting platform portion on either side of the airfoil preform; and the making of each second vane comprises deploying and shaping the two portions of the second fiber strip segment to form a preform for a set of hooks portion on either side of the airfoil preform;

an inner passage-constituting platform portion of each first vane being engaged on the outside of the set of hooks portion of each second vane when assembling the vanes together.

11. A method according to claim 1, wherein the first segment of the fiber blank is woven while leaving an internal zone of non-interlinking that extends over the entire longitudinal dimension of the first segment and that communicates at its ends with the zones of non-interlinking in the second segment and in the third segment, and the shaping of the first segment includes forming a passage along the zone of non-interlinking in the first segment in order to obtain a hollow airfoil preform.

12. A turbine engine turbine having a turbine casing and at least one turbine nozzle made of ceramic composite material having nozzle sectors fabricated by the method according to claim 1.

13. A turbine according to claim 12, wherein the nozzle has nozzle sectors and is mounted in the turbine casing by means of attachment tabs, wherein one of the two portions of the third segment of the fiber strip is deployed and shaped in order to form a preform for an outer passage-constituting platform portion on one side of the airfoil preform and the other portion of the third segment of the fiber strip is deployed and shaped in order to form a preform for a portion of a set of attachment tabs on the other side of the airfoil preform, the preforms for the outer passage-constituting platform portion and for the set of attachment tabs being attached to the airfoil preform at positions that are mutually offset in the longitudinal direction, such that when two adjacent vanes are assembled together a portion of the outer passage-constituting platform portion of one of the two vanes engages the inside of a portion of the set of attachment tabs of the other one of the two vanes.

14. A turbine according to claim 12, wherein the nozzle has nozzle sectors and is mounted in the turbine casing by means of attachment tabs, and the nozzle is fabricated including assembling and bonding together first single-airfoil vanes alternating with second single-airfoil vanes, and:

the making of each first vane comprises deploying and shaping the two portions of the third fiber strip segment in order to form a preform for an outer passage-constituting platform portion on either side of the airfoil preform; and the making of each second vane comprises deploying and shaping the two portions of the third fiber strip segment to form a preform for the set of attachment tabs portion on either side of the airfoil preform;

an outer passage-constituting platform portion of each first vane being engaged on the inside of a set of attachment tabs portion of each second vane during assembly of the vane.

15. A turbine according to claim 12, wherein the nozzle supports a support ring of abradable material via hooks and wherein one of the two portions of the second fiber strip segment is deployed and shaped in order to form a preform for an inner passage-constituting platform portion on one side of the airfoil preform, and the other portion of the second fiber strip segment is deployed and shaped in order to form a preform for a portion of a set of hooks on the other side of the vane preform, the preforms for the inner passage-constituting platform portions and for the set of hooks being connected to the airfoil preform at positions that are mutually offset in the longitudinal direction in such a manner that when assembling two adjacent vanes together, an inner passage-constituting platform portion of one of the two vanes engages on the outside of a portion of a set of hooks of the other one of the two vanes.

16. A turbine according to claim 12, wherein the nozzle supports a support ring of abradable material via hooks and comprises nozzle sectors fabricated according to a method including assembly and bonding together first single-airfoil vanes in alternation with second single-airfoil vanes, and:

the making of each first vane comprises deploying and shaping the two portions of the second fiber strip segment to form a preform for an inner passage-constituting platform portion on either side of the airfoil preform; and the making of each second vane comprises deploying and shaping the two portions of the second fiber strip segment to form a preform for a set of hooks portion on either side of the airfoil preform;

an inner passage-constituting platform portion of each first vane being engaged on the outside of the set of hooks portion of each second vane when assembling the vanes together.

17. A turbine engine compressor having a compressor casing and at least one compressor diffuser made of composite material comprising diffuser sectors fabricated according to the method of claim 1.

18. A compressor according to claim 17, wherein the diffuser is mounted in the compressor casing by means of attachment tabs and wherein one of the two portions of the third segment of the fiber strip is deployed and shaped in order to form a preform for an outer passage-constituting platform portion on one side of the airfoil preform and the other portion of the third segment of the fiber strip is deployed and shaped in order to form a preform for a portion of a set of attachment tabs on the other side of the airfoil preform, the preforms for the outer passage-constituting platform portion and for the set of attachment tabs being attached to the airfoil preform at positions that are mutually offset in the longitudinal direction, such that when two adjacent vanes are assembled together a portion of the outer passage-constituting platform portion of one of the two vanes engages the inside of a portion of the set of attachment tabs of the other one of the two vanes.

19. A compressor according to claim 17, wherein the diffuser is mounted in the compressor casing by means of the attachment tabs and comprises diffuser sectors fabricated according to a method including assembling and bonding together first single-airfoil vanes alternating with second single-airfoil vanes, and:

the making of each first vane comprises deploying and shaping the two portions of the third fiber strip segment in order to form a preform for an outer passage-constituting platform portion on either side of the airfoil preform; and the making of each second vane comprises deploying and shaping the two portions of the third fiber strip segment to form a preform for a set of attachment tabs portion on either side of the airfoil preform;

an outer passage-constituting platform portion of each first vane being engaged on the inside of the set of attachment tabs portion of each second vane during assembly of the vane.

20. A compressor according to claim 17, wherein the diffuser supports a support ring of abradable material via hooks and wherein one of the two portions of the second fiber strip segment is deployed and shaped in order to form a preform for an inner passage-constituting platform portion on one side of the airfoil preform, and the other portion of the second fiber strip segment is deployed and shaped in order to form a preform for a portion of a set of hooks on the other side of the vane preform, the preforms for the inner passage-constituting platform portions and for the set of hooks being connected to the airfoil preform at positions that are mutually offset in the longitudinal direction in such a manner that when assembling two adjacent vanes together, an inner passage-constituting platform portion of one of the two vanes engages on the outside of the portion of a set of hooks of the other one of the two vanes.

21. A compressor according to claim 17, wherein the diffuser supports a support ring of abradable material via hooks and including assembly and bonding together first single-airfoil vanes in alternation with second single-airfoil vanes, and:

the making of each first vane comprises deploying and shaping the two portions of the second fiber strip segment to form a preform for an inner passage-constituting platform portion on either side of the airfoil preform; and the making of each second vane comprises deploying and shaping the two portions of the second fiber strip segment to form a preform for a set of hooks portion on either side of the airfoil preform;

an inner passage-constituting platform portion of each first vane being engaged on the outside of the set of hooks portion of each second vane when assembling the vanes together.

22. A turbine engine comprising one or both of:

a turbine having a turbine casing and at least one turbine nozzle made of ceramic composite material having nozzle sectors and a compressor including nozzle sectors supporting a support ring of abradable material via hooks, one or both of the turbine and the compressor fabricated to a method comprising:

a) making a plurality of single-airfoil vane units, each vane having inner and outer platforms and an airfoil extending between the platforms and connected thereto, and being made by:

forming a fiber blank by three-dimensional weaving, the blank being in the form of a strip and comprising a first segment with second and third segments extending the first segment at respective first and second longitudinal ends thereof, each of the second and third segments being split into two portions on either side of a zone of non-interlinking extending within the thickness and across the entire width of the strip;

forming a fiber preform for the vane to be made by laterally deploying the two portions of the second segment and the two portions of the third segment and shaping said portions so as to obtain inner and outer platform preforms, and by shaping the first segment so as to obtain an airfoil preform; and at least partially densifying the fiber preform with a matrix in order to obtain and at least partially densified vane with inner and outer platforms incorporated therein; and b) assembling and bonding together a plurality of at least partially densified vanes:

the bonding being performed by a process comprising at least one step selected from: a step of bonding by brazing and a step of bonding by co-densification; and the inner or outer platform of a first vane comprising respectively an inner or outer passage-constituting platform portion that is bonded to respectively an inner or outer platform portion of an adjacent second vane in a bonding zone extending respectively over at least a portion of an inside surface of the inner passage-constituting platform portion of the first vane or over at least a portion of an inner surface of the outer passage-constituting platform portion of the first vane.

* * * * *